(12) United States Patent
Pellegrino et al.

(10) Patent No.: US 8,944,351 B2
(45) Date of Patent: Feb. 3, 2015

(54) PAINT CUP ASSEMBLY WITH AN OUTLET VALVE

(75) Inventors: Biagio P Pellegrino, Niskayuna, NY (US); Clemens E. Zoellner, Bay City, MI (US); Thomas R. Nixon, Au Gres, MI (US); Christopher J. Chilton, Jefferson, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 202 days.

(21) Appl. No.: 13/464,924

(22) Filed: May 4, 2012

(65) Prior Publication Data

US 2012/0280063 A1  Nov. 8, 2012

Related U.S. Application Data

(60) Provisional application No. 61/483,524, filed on May 6, 2011.

(51) Int. Cl.
| | | |
|---|---|---|
| B05B 1/30 | (2006.01) | |
| G01F 23/02 | (2006.01) | |
| B05B 7/24 | (2006.01) | |
| B05B 15/00 | (2006.01) | |

(52) U.S. Cl.
CPC .............. *G01F 23/02* (2013.01); *B05B 7/2408* (2013.01); *B05B 7/2478* (2013.01); *B05B 7/2481* (2013.01); *B05B 15/008* (2013.01)
USPC ....................................... 239/569; 239/581.2

(58) Field of Classification Search
CPC .... B05B 7/2408; B05B 7/2478; A01K 53/00; A01G 25/09; A01G 25/14
USPC ................. 239/302, 345, 376, 377, 354, 569, 239/581.1, 581.2, 272, 582.1, 379
See application file for complete search history.

(56) References Cited

U.S. PATENT DOCUMENTS

| | | | |
|---|---|---|---|
| 533,489 | A | 2/1895 | Ogram |
| 758,239 | A | 4/1904 | Ducart |
| 1,370,687 | A | 3/1921 | Ferris |
| 1,556,913 | A | 10/1924 | Capra |

(Continued)

FOREIGN PATENT DOCUMENTS

| | | | |
|---|---|---|---|
| AU | 200032550 B3 | 7/2000 | |
| AU | 199935838 A1 | 1/2001 | |

(Continued)

OTHER PUBLICATIONS

PCT/US2012/036684, International Search Report mailed Nov. 23, 2012, 1 page.

(Continued)

*Primary Examiner* — Davis Hwu
(74) *Attorney, Agent, or Firm* — Joseph P. Sullivan; Abel Law Group, LLP

(57) ABSTRACT

A paint cup assembly for a paint sprayer is disclosed and can include a paint reservoir, a cap configured to engage the paint reservoir, and a valve assembly disposed within the cap. The cap can include an outlet and the valve assembly can be operable from a closed configuration in which fluid flow through the outlet is prevented to an open configuration in which fluid flow through the outlet is permitted upon engagement with a paint sprayer.

17 Claims, 17 Drawing Sheets

(56) References Cited

U.S. PATENT DOCUMENTS

| | | | |
|---|---|---|---|
| 1,703,384 A | 2/1929 | Birkenmaier |
| 1,722,101 A | 7/1929 | Little |
| 1,748,440 A | 2/1930 | Burdick |
| 1,843,269 A | 2/1932 | Capser |
| 1,843,899 A | 2/1932 | Martinet |
| 2,004,574 A | 6/1935 | Gee, Jr. |
| 2,005,026 A | 6/1935 | Ellsworth |
| 2,051,518 A | 8/1936 | Cunningham |
| D105,960 S | 9/1937 | Lieberman |
| 2,177,032 A | 10/1939 | Baumgardner |
| 2,200,675 A | 5/1940 | Northcutt |
| 2,228,861 A | 1/1941 | Wegener |
| 2,310,633 A | 2/1943 | Heimburger |
| 2,318,717 A | 5/1943 | Rose |
| 2,593,639 A | 4/1952 | Whitehouse |
| 2,593,839 A | 4/1952 | Buc |
| 2,595,317 A | 5/1952 | White |
| 2,606,586 A | 8/1952 | Hill |
| 2,612,404 A | 9/1952 | Andersson |
| 2,641,365 A | 6/1953 | Lundeen |
| 2,656,217 A | 10/1953 | Roche |
| 2,670,239 A | 2/1954 | Ditch |
| 2,670,882 A | 3/1954 | Best |
| 2,770,706 A | 11/1956 | Vogtle et al. |
| 2,795,461 A | 6/1957 | Durkin |
| 2,851,187 A | 9/1958 | Hall |
| 2,877,934 A | 3/1959 | Wallace |
| 2,901,182 A | 8/1959 | Cragg et al. |
| 2,959,358 A | 11/1960 | Vork |
| 3,000,576 A | 9/1961 | Levey et al. |
| 3,035,623 A | 5/1962 | Goetz |
| 3,066,872 A | 12/1962 | Kobee |
| 3,134,494 A | 5/1964 | Quinn |
| 3,136,486 A | 6/1964 | Docken |
| 3,157,360 A | 11/1964 | Heard |
| 3,163,544 A | 12/1964 | Valyi |
| 3,167,210 A | 1/1965 | Carney, Jr. |
| 3,186,643 A | 6/1965 | George et al. |
| 3,195,819 A | 7/1965 | Watanabe |
| 3,198,438 A | 8/1965 | Hultgren |
| 3,211,324 A | 10/1965 | Sapien |
| 3,227,305 A | 1/1966 | Enssle |
| 3,236,459 A | 2/1966 | McRitchie |
| 3,240,398 A | 3/1966 | Dalton, Jr. |
| 3,255,972 A | 6/1966 | Hultgren et al. |
| 3,260,464 A | 7/1966 | Harant |
| 3,335,913 A | 8/1967 | Bouet |
| 3,338,406 A | 8/1967 | Anderson |
| 3,362,640 A | 1/1968 | Fainman |
| 3,381,845 A | 5/1968 | MacDonald |
| 3,393,842 A | 7/1968 | Bruce et al. |
| 3,401,842 A | 9/1968 | Morrison |
| 3,406,853 A | 10/1968 | McLeod |
| 3,432,104 A | 3/1969 | Kaltenbach |
| 3,487,989 A | 1/1970 | Rausing et al. |
| 3,507,309 A | 4/1970 | Johnson |
| 3,524,589 A | 8/1970 | Pelton, Jr. |
| 3,593,921 A | 7/1971 | Boltic |
| 3,606,092 A | 9/1971 | Kollmai |
| 3,658,122 A | 4/1972 | Kalyk |
| 3,672,645 A | 6/1972 | Terrels et al. |
| 3,674,074 A | 7/1972 | Lavis |
| 3,757,718 A | 9/1973 | Johnson |
| 3,773,211 A | 11/1973 | Bridgman |
| 3,776,408 A | 12/1973 | Wald |
| 3,779,419 A | 12/1973 | Heitz |
| 3,780,950 A | 12/1973 | Brennan |
| 3,784,039 A | 1/1974 | Marco |
| 3,790,017 A | 2/1974 | Fitzpatrick et al. |
| 3,790,021 A | 2/1974 | Bailey |
| 3,815,967 A | 6/1974 | Jocelyn |
| 3,841,555 A | 10/1974 | Lilja |
| 3,853,157 A | 12/1974 | Madaio |
| 3,858,810 A | 1/1975 | Seeley et al. |
| 3,892,360 A | 7/1975 | Schlottmann et al. |
| 3,934,746 A | 1/1976 | Lilja |
| 3,937,367 A | 2/1976 | Hood |
| 3,939,842 A | 2/1976 | Harris |
| 3,940,052 A | 2/1976 | McHugh |
| 4,035,004 A | 7/1977 | Hengesbach |
| 4,043,510 A | 8/1977 | Morris |
| 4,067,499 A | 1/1978 | Cohen |
| 4,069,751 A | 1/1978 | Gronwick et al. |
| 4,088,268 A | 5/1978 | Vohringer |
| 4,095,720 A | 6/1978 | Delbrouck et al. |
| 4,122,973 A | 10/1978 | Ahern |
| 4,140,279 A | 2/1979 | Hawkins |
| 4,151,929 A | 5/1979 | Sapien |
| 4,159,081 A | 6/1979 | Demler et al. |
| 4,186,783 A | 2/1980 | Brandt |
| 4,193,506 A | 3/1980 | Trindle et al. |
| D257,668 S | 12/1980 | Ahern |
| 4,258,862 A | 3/1981 | Thorsheim |
| 4,307,820 A | 12/1981 | Binoche |
| 4,321,922 A | 3/1982 | Deaton |
| 4,339,046 A | 7/1982 | Coen |
| 4,347,948 A | 9/1982 | Hamada et al. |
| 4,379,455 A | 4/1983 | Deaton |
| 4,383,635 A | 5/1983 | Yotoriyama |
| 4,388,044 A | 6/1983 | Wilkinson |
| 4,401,274 A | 8/1983 | Coffee |
| 4,403,738 A | 9/1983 | Kern |
| 4,405,088 A | 9/1983 | Gray |
| 4,406,406 A | 9/1983 | Knapp |
| 4,411,387 A | 10/1983 | Stern et al. |
| 4,418,843 A | 12/1983 | Jackman |
| 4,430,084 A | 2/1984 | Deaton |
| 4,442,003 A | 4/1984 | Holt |
| 4,455,140 A | 6/1984 | Joslin |
| 4,457,455 A | 7/1984 | Meshberg |
| 4,491,254 A | 1/1985 | Viets et al. |
| 4,501,500 A | 2/1985 | Terrels |
| 4,516,693 A | 5/1985 | Gaston |
| 4,558,792 A | 12/1985 | Cabernoch et al. |
| 4,559,140 A | 12/1985 | Croteau |
| 4,562,965 A | 1/1986 | Ihmels et al. |
| D283,832 S | 5/1986 | Weinstein et al. |
| 4,586,628 A | 5/1986 | Nittel |
| 4,621,770 A | 11/1986 | Sayen |
| 4,623,095 A | 11/1986 | Pronk |
| 4,625,890 A | 12/1986 | Galer |
| 4,628,644 A | 12/1986 | Somers |
| 4,633,052 A | 12/1986 | Beavers et al. |
| 4,645,097 A | 2/1987 | Kaufman |
| 4,653,691 A | 3/1987 | Grime |
| 4,657,151 A | 4/1987 | Cabernoch |
| D290,990 S | 7/1987 | Izzi |
| 4,693,423 A | 9/1987 | Roe et al. |
| 4,712,739 A | 12/1987 | Bihn |
| 4,760,962 A | 8/1988 | Wheeler |
| 4,781,311 A | 11/1988 | Dunning et al. |
| 4,811,904 A | 3/1989 | Ihmels et al. |
| 4,813,556 A | 3/1989 | Lawrence |
| 4,813,609 A | 3/1989 | French |
| D300,555 S | 4/1989 | Patterson |
| 4,818,589 A | 4/1989 | Johnson et al. |
| 4,824,018 A | 4/1989 | Shreve |
| 4,836,764 A | 6/1989 | Parkinson |
| 4,909,409 A | 3/1990 | Shreve |
| 4,925,055 A | 5/1990 | Robbins, III et al. |
| 4,930,644 A | 6/1990 | Robbins, III |
| 4,936,511 A | 6/1990 | Johnson et al. |
| D309,858 S | 8/1990 | Meyersburg |
| 4,946,558 A | 8/1990 | Salmon |
| 4,951,875 A | 8/1990 | Devey |
| 4,961,537 A | 10/1990 | Stern |
| 4,962,885 A | 10/1990 | Coffee |
| 4,971,251 A | 11/1990 | Dobrick et al. |
| 4,979,628 A | 12/1990 | Robbins, III |
| 4,982,868 A | 1/1991 | Robbins, III |
| 4,998,696 A | 3/1991 | Desjardins |
| 4,999,109 A | 3/1991 | Sabre |
| 5,005,726 A | 4/1991 | Robbins |
| 5,035,339 A | 7/1991 | Meyersburg |

(56) References Cited

U.S. PATENT DOCUMENTS

| | | |
|---|---|---|
| 5,052,623 A | 10/1991 | Nordeen |
| 5,054,687 A | 10/1991 | Burns et al. |
| 5,059,319 A | 10/1991 | Welsh |
| 5,060,816 A | 10/1991 | Robbins, III |
| 5,069,389 A | 12/1991 | Bitsakos |
| 5,071,070 A | 12/1991 | Hardy |
| 5,078,322 A | 1/1992 | Torntore |
| 5,078,323 A | 1/1992 | Frank |
| 5,094,543 A | 3/1992 | Mursa |
| 5,102,052 A | 4/1992 | Demarest et al. |
| 5,102,384 A | 4/1992 | Ross et al. |
| 5,118,003 A | 6/1992 | Pepper et al. |
| 5,119,992 A | 6/1992 | Grime |
| 5,123,571 A | 6/1992 | Rebeyrolle et al. |
| 5,143,242 A | 9/1992 | Millasich |
| 5,143,294 A | 9/1992 | Lintvedt |
| 5,186,828 A | 2/1993 | Mankin |
| 5,209,365 A | 5/1993 | Wood |
| 5,209,501 A | 5/1993 | Smith |
| 5,236,128 A | 8/1993 | Morita et al. |
| 5,236,506 A | 8/1993 | Mazakas |
| 5,238,150 A | 8/1993 | Williams |
| 5,248,089 A | 9/1993 | Bekius |
| 5,248,096 A | 9/1993 | Hoey et al. |
| 5,253,900 A | 10/1993 | Snyder |
| D341,189 S | 11/1993 | Legassie et al. |
| 5,259,400 A | 11/1993 | Bruno et al. |
| 5,261,751 A | 11/1993 | Heinz |
| 5,267,693 A | 12/1993 | Dickey |
| 5,269,840 A | 12/1993 | Morris et al. |
| 5,295,606 A | 3/1994 | Karwoski |
| 5,308,647 A | 5/1994 | Lappi |
| 5,326,001 A | 7/1994 | Holmquist et al. |
| 5,328,095 A | 7/1994 | Wickenhaver |
| 5,332,158 A | 7/1994 | Styne et al. |
| 5,337,921 A | 8/1994 | Wilson et al. |
| 5,341,836 A | 8/1994 | Doherty |
| 5,358,402 A | 10/1994 | Reed et al. |
| 5,368,395 A | 11/1994 | Crimmins |
| 5,377,852 A | 1/1995 | Demorest |
| 5,381,918 A | 1/1995 | Dahl |
| 5,385,251 A | 1/1995 | Dunn |
| 5,400,573 A | 3/1995 | Crystal et al. |
| 5,405,090 A | 4/1995 | Greene et al. |
| 5,415,352 A | 5/1995 | May |
| 5,421,489 A | 6/1995 | Holzner, Sr. et al. |
| 5,424,086 A | 6/1995 | Walker |
| 5,454,488 A | 10/1995 | Geier |
| 5,460,289 A | 10/1995 | Gemmell |
| 5,462,711 A | 10/1995 | Ricottone |
| 5,468,383 A | 11/1995 | McKenzie |
| 5,492,242 A | 2/1996 | Gall |
| 5,501,397 A | 3/1996 | Holt |
| 5,569,377 A | 10/1996 | Hashimoto |
| 5,582,350 A | 12/1996 | Kosmyna et al. |
| 5,607,082 A | 3/1997 | Cracauer |
| 5,617,972 A | 4/1997 | Morano et al. |
| 5,631,055 A | 5/1997 | Vines et al. |
| 5,655,714 A | 8/1997 | Kieffer et al. |
| 5,667,858 A | 9/1997 | Pokorny |
| D386,654 S | 11/1997 | Kosmyna |
| 5,695,837 A | 12/1997 | Everaerts et al. |
| 5,713,519 A | 2/1998 | Sandison et al. |
| 5,789,684 A | 8/1998 | Masek et al. |
| 5,797,520 A | 8/1998 | Donahue |
| 5,803,302 A | 9/1998 | Sato et al. |
| 5,803,367 A | 9/1998 | Heard et al. |
| 5,806,711 A | 9/1998 | Morano et al. |
| 5,816,431 A | 10/1998 | Giannopoulos |
| 5,816,501 A | 10/1998 | LoPresti et al. |
| 5,826,795 A | 10/1998 | Holland et al. |
| 5,829,588 A | 11/1998 | Bloomfield |
| 5,853,102 A | 12/1998 | Jarrett |
| 5,863,431 A | 1/1999 | Salzburg |
| 5,878,899 A | 3/1999 | Manganiello et al. |
| 5,921,426 A | 7/1999 | Randolph |
| 5,938,016 A | 8/1999 | Erdtmann |
| 5,954,273 A | 9/1999 | Ruta et al. |
| 5,964,365 A | 10/1999 | Peeples et al. |
| 5,967,379 A | 10/1999 | Crossdale et al. |
| 5,996,427 A | 12/1999 | Masek et al. |
| 6,019,294 A | 2/2000 | Anderson et al. |
| 6,027,041 A | 2/2000 | Evans |
| 6,053,429 A | 4/2000 | Chang |
| 6,092,740 A | 7/2000 | Liu |
| D431,279 S | 9/2000 | Spriegel |
| 6,196,410 B1 | 3/2001 | Hocking |
| 6,257,429 B1 | 7/2001 | Kong |
| 6,264,115 B1 | 7/2001 | Liska et al. |
| 6,277,478 B1 | 8/2001 | Kurita et al. |
| 6,287,669 B1 | 9/2001 | George et al. |
| D449,381 S | 10/2001 | de Begon de Larouziere |
| 6,302,445 B1 | 10/2001 | Kugele et al. |
| 6,371,385 B1 | 4/2002 | Schiller et al. |
| 6,390,386 B2 | 5/2002 | Krohn et al. |
| 6,394,152 B1 | 5/2002 | Martin |
| D460,825 S | 7/2002 | Renz |
| 6,435,426 B1 | 8/2002 | Copp, Jr. |
| D462,268 S | 9/2002 | Schroeder et al. |
| 6,455,140 B1 | 9/2002 | Whitney et al. |
| 6,475,609 B1 | 11/2002 | Whitney et al. |
| 6,536,684 B1 | 3/2003 | Wei |
| 6,536,687 B1 | 3/2003 | Navis et al. |
| 6,588,681 B2 | 7/2003 | Rothrum et al. |
| 6,595,441 B2 | 7/2003 | Petrie et al. |
| 6,663,018 B2 | 12/2003 | Rothrum et al. |
| 6,698,670 B1 | 3/2004 | Gosis et al. |
| 6,712,292 B1 | 3/2004 | Gosis et al. |
| 6,717,673 B1 | 4/2004 | Janssen et al. |
| 6,749,132 B2 * | 6/2004 | Pettit et al. ............. 239/296 |
| 6,752,179 B1 | 6/2004 | Schwartz |
| 6,796,514 B1 | 9/2004 | Schwartz |
| 6,820,824 B1 | 11/2004 | Joseph et al. |
| 6,871,594 B1 * | 3/2005 | Estrella .................. 102/498 |
| 6,877,677 B2 | 4/2005 | Schmon et al. |
| 6,899,239 B1 | 5/2005 | Gray |
| 6,938,836 B2 | 9/2005 | Bouic |
| 6,942,126 B2 | 9/2005 | Douglas et al. |
| 6,945,429 B2 | 9/2005 | Gosis et al. |
| 6,946,122 B2 | 9/2005 | Yang |
| 6,953,155 B2 | 10/2005 | Joseph et al. |
| 6,958,033 B1 | 10/2005 | Malin |
| 6,982,108 B2 | 1/2006 | Janssen et al. |
| 7,014,127 B2 * | 3/2006 | Valpey et al. .......... 239/337 |
| 7,083,119 B2 | 8/2006 | Bouic et al. |
| 7,086,549 B2 | 8/2006 | Kosmyna et al. |
| 7,128,102 B2 | 10/2006 | Pendleton et al. |
| 7,143,960 B2 | 12/2006 | Joseph et al. |
| 7,159,734 B1 | 1/2007 | O'Brien |
| 7,165,732 B2 | 1/2007 | Kosmyna et al. |
| 7,172,139 B2 | 2/2007 | Bouic et al. |
| 7,188,785 B2 | 3/2007 | Joseph et al. |
| 7,269,969 B2 | 9/2007 | Strickland et al. |
| 7,296,759 B2 | 11/2007 | Alexander et al. |
| 7,344,040 B2 | 3/2008 | Kosmyna et al. |
| 7,353,964 B2 | 4/2008 | Kosmyna |
| 7,354,074 B2 | 4/2008 | Kosmyna et al. |
| 7,374,111 B2 | 5/2008 | Joseph et al. |
| 7,380,680 B2 | 6/2008 | Kosmyna et al. |
| 7,451,884 B2 | 11/2008 | Kuehn et al. |
| D582,512 S | 12/2008 | Fontaine |
| D586,059 S | 2/2009 | Bechtold, Jr. |
| 7,568,638 B2 | 8/2009 | Gehrung |
| 7,625,016 B2 | 12/2009 | Kosmyna et al. |
| D615,161 S | 5/2010 | Gerson et al. |
| 7,757,972 B2 | 7/2010 | Kosmyna et al. |
| 7,798,421 B2 | 9/2010 | Joseph et al. |
| 7,798,425 B2 | 9/2010 | Joseph et al. |
| 7,798,426 B2 | 9/2010 | Joseph et al. |
| 7,798,427 B2 | 9/2010 | Joseph et al. |
| 7,802,763 B2 | 9/2010 | Faller et al. |
| 7,810,744 B2 | 10/2010 | Schmon et al. |
| 7,819,263 B1 | 10/2010 | DiCarlo-Nelson |
| 7,819,341 B2 | 10/2010 | Schmon et al. |

(56) References Cited

U.S. PATENT DOCUMENTS

| | | |
|---|---|---|
| 7,823,806 B2 | 11/2010 | Schmon |
| 7,878,425 B2 | 2/2011 | Handzel et al. |
| 7,921,583 B2 | 4/2011 | Londino |
| 8,002,200 B2 | 8/2011 | Joseph et al. |
| 8,033,413 B2 | 10/2011 | Gerson et al. |
| 8,127,963 B2 | 3/2012 | Gerson et al. |
| 8,201,709 B1 | 6/2012 | Namigata et al. |
| 8,230,997 B1 | 7/2012 | McWilliams et al. |
| 8,272,255 B2 | 9/2012 | Halverson et al. |
| 2002/0014541 A1 | 2/2002 | Krohn et al. |
| 2002/0121139 A1 | 9/2002 | Purpura et al. |
| 2003/0003301 A1 | 1/2003 | Whitney et al. |
| 2003/0008144 A1 | 1/2003 | Whitney et al. |
| 2003/0209573 A1 | 11/2003 | Bouic |
| 2004/0016825 A1 | 1/2004 | Petrie et al. |
| 2004/0067350 A1 | 4/2004 | Janssen et al. |
| 2004/0084553 A1 | 5/2004 | Joseph et al. |
| 2004/0118941 A1 | 6/2004 | Joseph et al. |
| 2004/0140373 A1 | 7/2004 | Joseph et al. |
| 2004/0164182 A1 | 8/2004 | Joseph et al. |
| 2004/0217201 A1 | 11/2004 | Ruda |
| 2004/0232714 A1 | 11/2004 | Coppotelli et al. |
| 2004/0256484 A1 | 12/2004 | Joseph et al. |
| 2004/0256485 A1 | 12/2004 | Joseph et al. |
| 2005/0029285 A1 | 2/2005 | Gay, III et al. |
| 2005/0045146 A1 | 3/2005 | McKay et al. |
| 2005/0067502 A1 | 3/2005 | Bouic et al. |
| 2005/0092770 A1 | 5/2005 | Yechouron |
| 2005/0145718 A1 | 7/2005 | Blette et al. |
| 2005/0145723 A1 | 7/2005 | Blette et al. |
| 2005/0145724 A1 | 7/2005 | Blette et al. |
| 2005/0156058 A1 | 7/2005 | Kosmyna et al. |
| 2005/0241722 A1 | 11/2005 | Pendleton et al. |
| 2005/0242107 A1 | 11/2005 | Kosmyna et al. |
| 2005/0258271 A1 | 11/2005 | Kosmyna et al. |
| 2005/0263614 A1 | 12/2005 | Kosmyna et al. |
| 2005/0279748 A1 | 12/2005 | Kosmyna |
| 2006/0000927 A1 | 1/2006 | Ruda |
| 2006/0017286 A1 | 1/2006 | Kosmyna et al. |
| 2006/0043217 A1 | 3/2006 | Kosmyna et al. |
| 2006/0065591 A1 | 3/2006 | Joseph |
| 2006/0102550 A1 | 5/2006 | Joseph et al. |
| 2006/0144960 A1 | 7/2006 | Kosmyna et al. |
| 2006/0151630 A1 | 7/2006 | Joseph et al. |
| 2006/0157594 A1* | 7/2006 | Cooke ............... 239/533.11 |
| 2006/0175433 A1 | 8/2006 | Escoto, Jr. et al. |
| 2006/0196891 A1 | 9/2006 | Gerson et al. |
| 2006/0273204 A1 | 12/2006 | Joseph et al. |
| 2006/0283861 A1 | 12/2006 | Kosmyna et al. |
| 2007/0131793 A1 | 6/2007 | Joseph et al. |
| 2007/0158348 A1 | 7/2007 | Kosmyna et al. |
| 2007/0252019 A1* | 11/2007 | Peterson et al. ............... 239/337 |
| 2007/0272323 A1 | 11/2007 | Verhaeghe |
| 2008/0011879 A1 | 1/2008 | Gerson et al. |
| 2008/0054087 A1 | 3/2008 | Joseph et al. |
| 2008/0118656 A1 | 5/2008 | Douglas et al. |
| 2009/0072050 A1* | 3/2009 | Ruda ............... 239/345 |
| 2009/0110861 A1 | 4/2009 | Sherman |
| 2009/0145980 A1 | 6/2009 | Jones |
| 2009/0166443 A1 | 7/2009 | Joseph et al. |
| 2009/0183565 A1 | 7/2009 | Shamoon et al. |
| 2009/0193880 A1 | 8/2009 | Halverson et al. |
| 2009/0200309 A1 | 8/2009 | Kosmyna et al. |
| 2010/0108783 A1 | 5/2010 | Joseph et al. |
| 2010/0139858 A1 | 6/2010 | Douglas et al. |
| 2010/0163645 A1 | 7/2010 | Johnson et al. |
| 2010/0243758 A1* | 9/2010 | Juo ............... 239/302 |
| 2010/0288772 A1 | 11/2010 | Wambeke et al. |
| 2011/0220737 A1 | 9/2011 | Kwon |
| 2011/0266368 A1 | 11/2011 | Joseph et al. |
| 2012/0037529 A1 | 2/2012 | Hall |
| 2012/0256010 A1 | 10/2012 | Joseph et al. |
| 2012/0273583 A1 | 11/2012 | Gerson et al. |
| 2012/0279609 A1 | 11/2012 | Pellegrino et al. |
| 2012/0279613 A1 | 11/2012 | Pellegrino et al. |
| 2012/0279887 A1 | 11/2012 | Pellegrino et al. |
| 2012/0279970 A1 | 11/2012 | Pellegrino et al. |
| 2012/0280062 A1 | 11/2012 | Pellegrino et al. |
| 2012/0280063 A1 | 11/2012 | Pellegrino et al. |
| 2013/0001322 A1 | 1/2013 | Pellegrino et al. |

FOREIGN PATENT DOCUMENTS

| | | |
|---|---|---|
| AU | 2004/202537 A1 | 1/2005 |
| CA | 963436 | 2/1975 |
| CA | 965388 | 4/1975 |
| CA | 1006450 | 3/1977 |
| CA | 1192852 A | 9/1985 |
| CA | 2099763 A1 | 7/1992 |
| CA | 2569369 A1 | 7/1998 |
| CA | 2660187 A1 | 7/1998 |
| CA | 2595507 A1 | 6/2006 |
| CA | 2277096 C | 4/2007 |
| CH | 540159 A | 8/1973 |
| CH | 688082 A | 5/1997 |
| CN | 1142830 C | 3/2004 |
| DE | 534273 C | 9/1931 |
| DE | 2412743 A1 | 9/1975 |
| DE | 2900998 A1 | 7/1980 |
| DE | 3020831 A1 | 12/1981 |
| DE | 8304005 U1 | 6/1983 |
| DE | 3439442 A1 | 4/1986 |
| DE | 3517122 C1 | 5/1986 |
| DE | 3507734 A1 | 9/1986 |
| DE | 3346165 C2 | 4/1987 |
| DE | G 8807118 U1 | 9/1988 |
| DE | 4002190 A1 | 8/1991 |
| DE | 4102326 A1 | 7/1992 |
| DE | 4209258 A1 | 9/1993 |
| DE | 19618514 A1 | 11/1997 |
| DE | 29905100 U1 | 6/1999 |
| DE | 20117496 U1 | 1/2002 |
| DE | 29825015 U1 | 3/2004 |
| DE | 29825119 U1 | 1/2005 |
| DE | 29825120 U1 | 2/2005 |
| DE | 98901823 T1 | 3/2005 |
| DE | 202004003116 U | 7/2005 |
| DE | 202004003376 U | 7/2005 |
| DE | 202004006907 U1 | 10/2005 |
| DE | 69831653 T2 | 9/2006 |
| DE | 69836570 T2 | 9/2007 |
| EP | 0092359 A2 | 10/1983 |
| EP | 0202124 A2 | 11/1986 |
| EP | 0230364 A2 | 7/1987 |
| EP | 0345607 A1 | 12/1989 |
| EP | 0388199 A2 | 9/1990 |
| EP | 0388696 A1 | 9/1990 |
| EP | 0467334 A2 | 1/1992 |
| EP | 0345607 B1 | 9/1992 |
| EP | 0230364 B2 | 9/1994 |
| EP | 0624353 A2 | 11/1994 |
| EP | 0634224 A1 | 1/1995 |
| EP | 0636548 A1 | 2/1995 |
| EP | 0678334 A2 | 10/1995 |
| EP | 0689825 A1 | 1/1996 |
| EP | 0636548 B1 | 2/1997 |
| EP | 0536344 B1 | 10/1997 |
| EP | 0847809 A1 | 6/1998 |
| EP | 0740692 B1 | 12/1998 |
| EP | 0624353 B1 | 2/1999 |
| EP | 0987060 A1 | 3/2000 |
| EP | 1123957 A1 | 8/2001 |
| EP | 1047732 B1 | 9/2002 |
| EP | 1366823 A1 | 3/2003 |
| EP | 1139841 B1 | 5/2003 |
| EP | 1047731 B1 | 6/2003 |
| EP | 1210181 B1 | 10/2003 |
| EP | 1415719 A1 | 5/2004 |
| EP | 1424135 A1 | 6/2004 |
| EP | 1435265 A2 | 7/2004 |
| EP | 1368129 B1 | 6/2005 |
| EP | 1566223 A2 | 8/2005 |
| EP | 1579922 A1 | 9/2005 |
| EP | 1611960 A1 | 1/2006 |

(56) References Cited

FOREIGN PATENT DOCUMENTS

| | | |
|---|---|---|
| EP | 1415719 B1 | 11/2006 |
| EP | 000638176-0001 | 1/2007 |
| EP | 1961488 A2 | 8/2008 |
| EP | 2090372 A2 | 8/2009 |
| EP | 2090373 A2 | 8/2009 |
| EP | 2105208 A2 | 9/2009 |
| EP | 1435265 B1 | 11/2009 |
| EP | 2221112 A2 | 8/2010 |
| EP | 1385632 B1 | 3/2011 |
| EP | 2090372 A3 | 11/2011 |
| EP | 2090373 A3 | 11/2011 |
| EP | 2105208 A3 | 11/2011 |
| FR | 1282085 | 1/1962 |
| FR | 2631254 A1 | 11/1989 |
| FR | 2639324 A1 | 5/1990 |
| FR | 2798868 A1 | 3/2001 |
| GB | 202363 A | 8/1923 |
| GB | 256179 A | 6/1927 |
| GB | 290866 A | 5/1928 |
| GB | 843161 A | 8/1960 |
| GB | 1077369 A | 7/1967 |
| GB | 1567685 | 5/1980 |
| GB | 2103173 A | 2/1983 |
| GB | 2170471 A | 8/1986 |
| GB | 2239821 A | 7/1991 |
| GB | 2303087 A | 2/1997 |
| JP | 52113870 | 9/1977 |
| JP | 64-27659 | 1/1989 |
| JP | JUM3-81879 U | 8/1991 |
| JP | JUM 05-39671 U | 5/1993 |
| JP | 6-328014 A | 11/1994 |
| JP | 6-335643 A | 12/1994 |
| JP | 7-289956 A | 11/1995 |
| JP | A 08-133338 | 5/1996 |
| JP | JUM 3027372 | 5/1996 |
| JP | 8-192851 A | 7/1996 |
| JP | 10007170 A | 1/1998 |
| JP | 11-028394 A | 2/1999 |
| JP | 2001508698 A | 7/2001 |
| JP | 2001-252599 A | 9/2001 |
| JP | 2007-130521 | 5/2007 |
| JP | 2008-036561 A | 2/2008 |
| JP | 2008036561 A | 2/2008 |
| KR | 10-2007-0023711 A | 2/2007 |
| KR | 1020070023711 A | 2/2007 |
| KR | 10-2010-0052366 A | 5/2010 |
| WO | 90-015758 | 12/1990 |
| WO | 90-15758 A1 | 12/1990 |
| WO | 9206794 A1 | 4/1992 |
| WO | 92/11930 A1 | 7/1992 |
| WO | 92/14437 A1 | 9/1992 |
| WO | 92/19386 A1 | 11/1992 |
| WO | 9403337 A2 | 2/1994 |
| WO | 9408730 A1 | 4/1994 |
| WO | 95/07762 A1 | 3/1995 |
| WO | 95/11170 A1 | 4/1995 |
| WO | 9519402 A1 | 7/1995 |
| WO | 98/00796 A2 | 1/1998 |
| WO | 98/32539 A1 | 7/1998 |
| WO | 99/06301 A1 | 2/1999 |
| WO | 9936477 A1 | 7/1999 |
| WO | 9936478 A1 | 7/1999 |
| WO | 9940580 A1 | 8/1999 |
| WO | 99/50153 A1 | 10/1999 |
| WO | 00/30844 A1 | 6/2000 |
| WO | 00/38562 A1 | 7/2000 |
| WO | 0114766 A1 | 3/2001 |
| WO | 02072276 A1 | 9/2002 |
| WO | 02/085533 A1 | 10/2002 |
| WO | 03/006170 A2 | 1/2003 |
| WO | 03/045575 A1 | 6/2003 |
| WO | 03095101 A1 | 11/2003 |
| WO | 2004030938 A1 | 4/2004 |
| WO | 2004030939 A1 | 4/2004 |
| WO | 2004/037432 A1 | 5/2004 |
| WO | 2004/037433 A1 | 5/2004 |
| WO | 2004/060574 A1 | 7/2004 |
| WO | 2004/060575 A1 | 7/2004 |
| WO | 2004/082848 A1 | 9/2004 |
| WO | 2004/094072 A1 | 11/2004 |
| WO | 2005/077543 A1 | 8/2005 |
| WO | 2005/115631 A1 | 12/2005 |
| WO | 2005/118151 A1 | 12/2005 |
| WO | 2005/120178 A2 | 12/2005 |
| WO | 2005/120718 A1 | 12/2005 |
| WO | 2005118151 A1 | 12/2005 |
| WO | 2006/002497 A1 | 1/2006 |
| WO | 2006/065850 A1 | 6/2006 |
| WO | 2006069015 A1 | 6/2006 |
| WO | 2006098799 A3 | 9/2006 |
| WO | 2007/037921 A1 | 4/2007 |
| WO | 2007075724 A2 | 7/2007 |
| WO | 2006098799 A9 | 9/2007 |
| WO | 2007/149760 A2 | 12/2007 |
| WO | 2007/149760 A3 | 12/2007 |
| WO | 2008022027 A2 | 2/2008 |
| WO | 2008060939 A1 | 5/2008 |
| WO | 2008109733 A1 | 9/2008 |
| WO | 2008154559 A1 | 12/2008 |
| WO | 2009058466 A1 | 5/2009 |
| WO | 2009/076150 A2 | 6/2009 |
| WO | 2009/076150 A3 | 6/2009 |
| WO | 2009120547 A2 | 10/2009 |
| WO | 2012/068316 A2 | 5/2012 |
| WO | 2012/154619 A2 | 11/2012 |
| WO | 2012/154621 A2 | 11/2012 |
| WO | 2012/154622 A2 | 11/2012 |
| WO | 2012/154623 A2 | 11/2012 |
| WO | 2012/154624 A2 | 11/2012 |
| WO | 2012/154625 A2 | 11/2012 |
| WO | 2013/003592 A2 | 1/2013 |

OTHER PUBLICATIONS

Amended Complaint and Demand for Jury Trial *3M Innovative Properties Company and 3M Company* vs. *Illinois Tool Works, Inc. and ITW Finishing, L.L.C.*, Case No. 06-2459 (U.S. District Court, District of Minnesota) filed Aug. 7, 2006 (5 pgs).

Answer and Counter-Claim to amended Complaint, *3M Innovative Properties Company and 3M Company* vs. *Illinois Tool Works, Inc. and ITW Finishing, L.L.C.*, Case No. 06-2459 (U.S. District Court, District of Minnesota) filed Aug. 21, 2006 (8 pgs).

Answer of Defendants Demand for Jury Trial, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Oct. 15, 2008 (4 pages).

Complaint and Demand for Jury Trial, *3M Innovative Properties Company and 3M Company* vs. *Illinois Tool Works, Inc. and ITW DeVilbiss*, Case No. 06-2459 (U.S. District Court, District of Minnesota), filed Jun. 16, 2006 (29 pgs).

Complaint and Demand for Jury Trial, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Aug. 19, 2008 (30 pages).

Defendants' Claim Chart, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Mar. 2, 2009 (140 pages).

Defendants' Identification of Claim Terms, Phrases or Clauses That May Require Court Construction, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Apr. 6, 2009 (3 pages).

Defendant's Prior Art Statement, *3M Innovative Properties Company and 3M Company* vs. *Illinois Tool Works, Inc. and ITW Finishing LLC*, Case No. 06-2459 [U.S. District Court, District of Minnesota] filed Apr. 2, 2007 [12 pages].

(56) References Cited

OTHER PUBLICATIONS

Defendants' Prior Art Statement, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Mar. 2, 2009 (46 pages).
DeVilbiss PT-500, 510 and 520 2 ½ Gallon Pressure Tank service bulletin—SB-21-041-B., 6 pages.
DeVilbiss Products PT-500, 510 and 520 2 ½ Gallon Pressure Tank, Oct. 1998, 7 pages.
DeVilbiss Industrial Distributor Net Price List Spray Equipment, DDP-104, Supplement 1, Oct. 1, 1988, 3 pages.
Falkman, M.A. Plastic Discs Scrap Waste for Disposable Containers. Packaging Digest, Jun. 1996, 2 pages.
Louis M. Gerson Co., Inc. and Gerson Professional Products, Inc. Answers to 3M's First Set of Interrogatories to Gerson (Nos. 1-22), *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Dec. 11, 2008 (14 pages).
Notice of Opposition and Grounds of Opposition to European Patent No. EP 0954381, *Illinois Tool Works, Inc.* vs. *3M Company*, dated Jun. 19, 2006, 21 pages.
Plaintiffs' Claim Chart, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Feb. 2, 2009 (52 pages).
Plaintiffs' Prior Art Statement, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Apr. 1, 2009 (25 pages).
SATA Jet 90, Operating Instructions, SATA-Fabspritztechnik GmH & Co., 6 pages.
SATA GmbH & Co. KG, "SATA RPS—The cup system for mixing and painting", K-126995/4022-063, 4 pages.
Service Bulletin, SB-4-043-D, Replaces SB-4-043-C, De Vilbiss, "120175 (GFC-502) 32 Oz. Aluminum Gravity Feed Cup with Disposable Lid and Cup Liner", May 2000.
Service Bulletin; SB-21-041-B, replaces SB-21-041-A, PT-500, 510, and 520 2 ½ Gallon Pressure Tank, Oct. 1987 product literature, 6 pages.
International Search Report for PCT Application No. PCT/US05/45146 dated Apr. 21, 2006.
International Search Report for PCT Application No. PCT/US11/61091 dated May 11, 2012.
International Search Report for PCT Application No. PCT/US12/36680 dated Nov. 16, 2012.
International Search Report for PCT Application No. PCT/US12/36684 dated Nov. 23, 2012.
International Search Report for PCT Application No. PCT/US12/36682 dated Nov. 23, 2012.
International Search Report for PCT Application No. PCT/US12/36685 dated Nov. 23, 2012.
International Search Report for PCT Application No. PCT/US12/36686 dated Nov. 23, 2012.
International Search Report for PCT Application No. PCT/US12/36687 dated Nov. 30, 2012.
Inter Partes Reexamination of US Patent No. 7,374,111 filed Dec. 9, 2008, issued Reexamination No. 95/000,422, 86 pages.
International Search Report for PCT Application No. PCT/US12/44648 dated Jan. 24, 2013.
U.S. Appl. No. 13/728,678, filed Dec. 27, 2012, entitled "Convertible Paint Cup Assembly with Air Inlet Valve".
International Search Report for PCT Application No. PCT/US2012/071843 dated Apr. 29, 2013.

* cited by examiner

PAINT CUP ASSEMBLY WITH AN OUTLET VALVE

CROSS-REFERENCE TO RELATED APPLICATION(S)

The present application claims priority from U.S. Provisional Patent Application No. 61/483,524, filed May 6, 2011, entitled "PAINT CUP ASSEMBLY," naming inventors Biagio P. Pellegrino, Clemens E. Zoellner, Thomas R. Nixon, Christopher J. Chilton and Ronald J. Cuccia, which application is incorporated by reference herein in its entirety.

FIELD OF THE DISCLOSURE

The present disclosure is directed to a paint cup assembly and to a paint cup assembly having a spring loaded valve disposed along an outlet.

BACKGROUND

Spray guns can be used for rapidly coating surfaces with liquids, such as paint. Paint can be contained in a container that attaches to the spray gun. The outlet of the container can be a releasably connectable coupling that connects to the spray gun. Paint can flow from the container into the spray gun and then, fed to a spray nozzle. The spray nozzle can combine the paint with air, atomize the liquid, and form a spray. At the end of the spraying operation, the container and the mating connection to the spray gun should be thoroughly cleaned so that the paint from one operation does not contaminate the paint to be sprayed in the next spraying operation. Additionally, the coupling between container and spray gun should be free of any dried liquid that might interfere with the connection between container and spray gun. A container with a lid and a disposable cup or liner can be used to eliminate or reduce the labor required to clean the container and the coupling to the spray gun.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures can be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or other features that are inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the embodiments of the disclosure. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this disclosure belongs. The materials, methods, and examples are illustrative only and not intended to be limiting.

Figure 1:
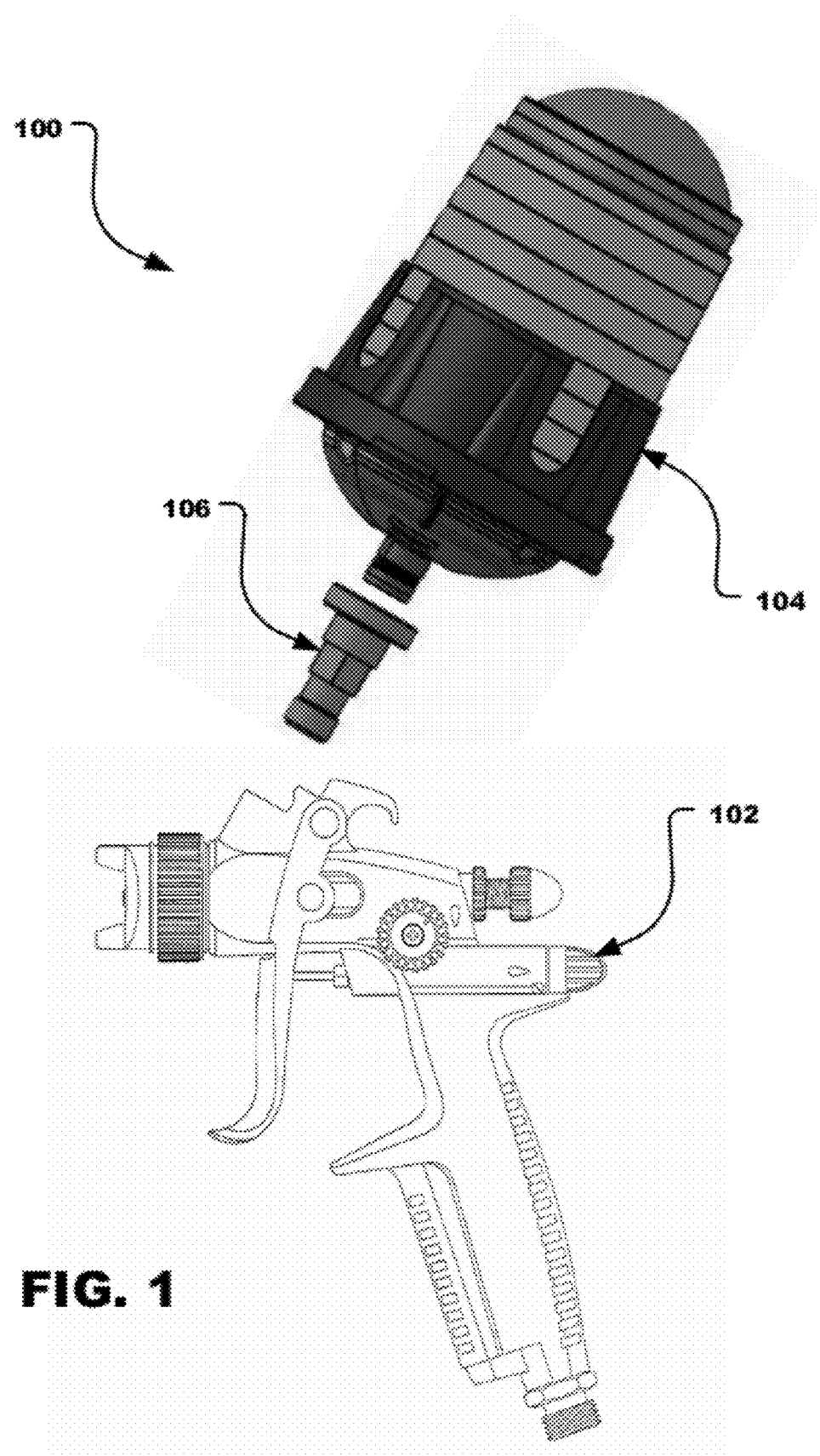
FIG. 1 includes a plan view of a paint sprayer assembly in accordance with a particular embodiment.

Referring initially to FIG. 1, a paint sprayer assembly is illustrated and is generally designated 100. As illustrated, the paint sprayer assembly 100 includes a paint spray gun 102 and a paint cup assembly 104 that can be removably engaged with the paint spray gun 102 via an adapter 106. In a particular aspect, the adapter 106 can be threadably engaged with the paint spray gun 102 and the paint cup assembly 104 can be inserted into the adapter 104. Further, during operation of the paint spray gun 102, the paint cup assembly 104 can be in fluid communication with the paint spray gun 102. Specifically, the paint cup assembly 104 can deliver paint to the paint spray gun 102 and the paint spray gun 102 can be used to transmit the fluid, e.g., paint, to a substrate, e.g., a car body.

FIG. 2 through FIG. 9 illustrate details concerning the paint cup assembly 104 that is depicted in FIG. 1 in conjunction with the paint spray gun 102. Specifically, FIG. 2 and FIG. 3 include details concerning the paint cup assembly 104 in its entirety and FIG. 4 through FIG. 9 illustrate details concerning various component parts of the paint cup assembly 104.

Figure 2:
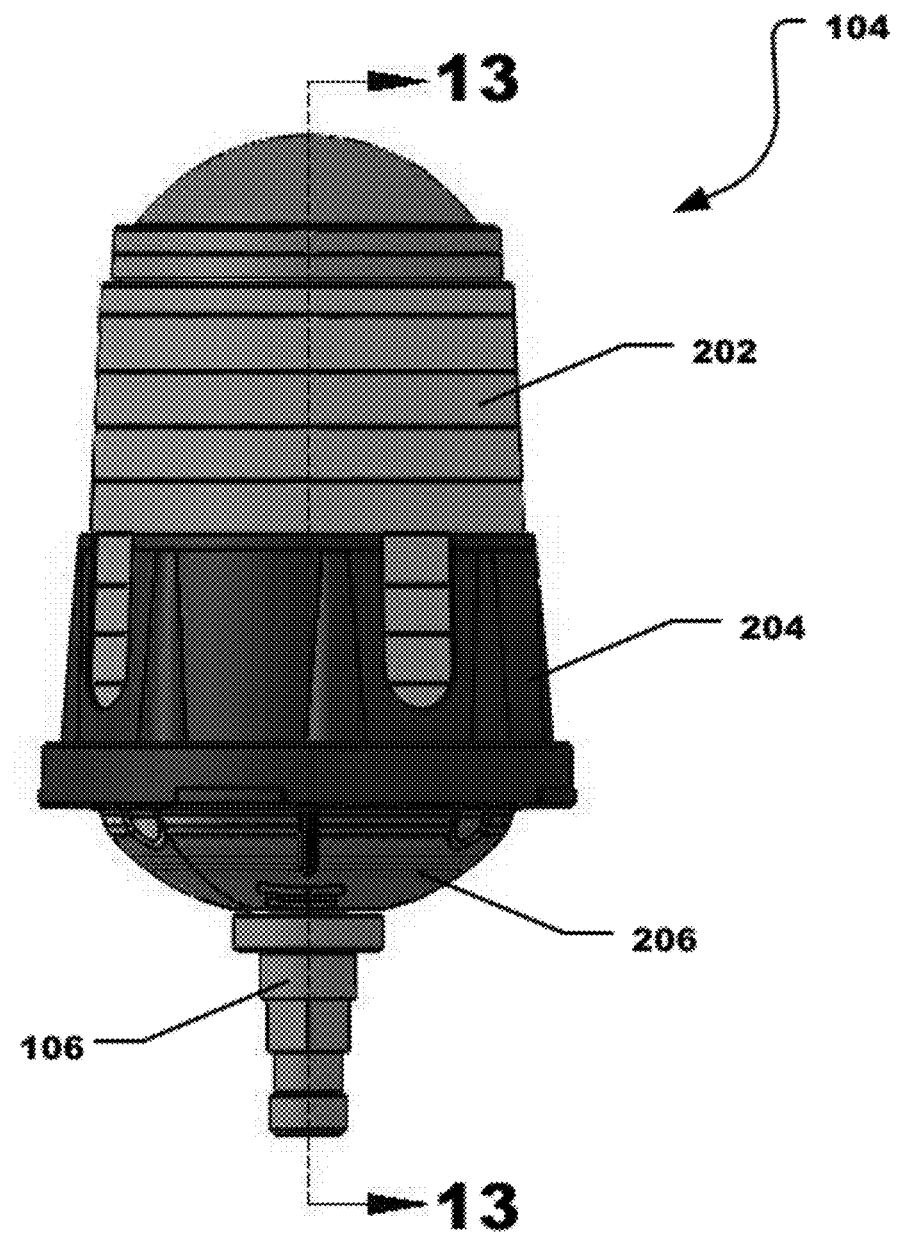
FIG. 2 includes a plan view of a paint cup assembly engaged with an adapter in accordance with a particular embodiment.
Figure 3:
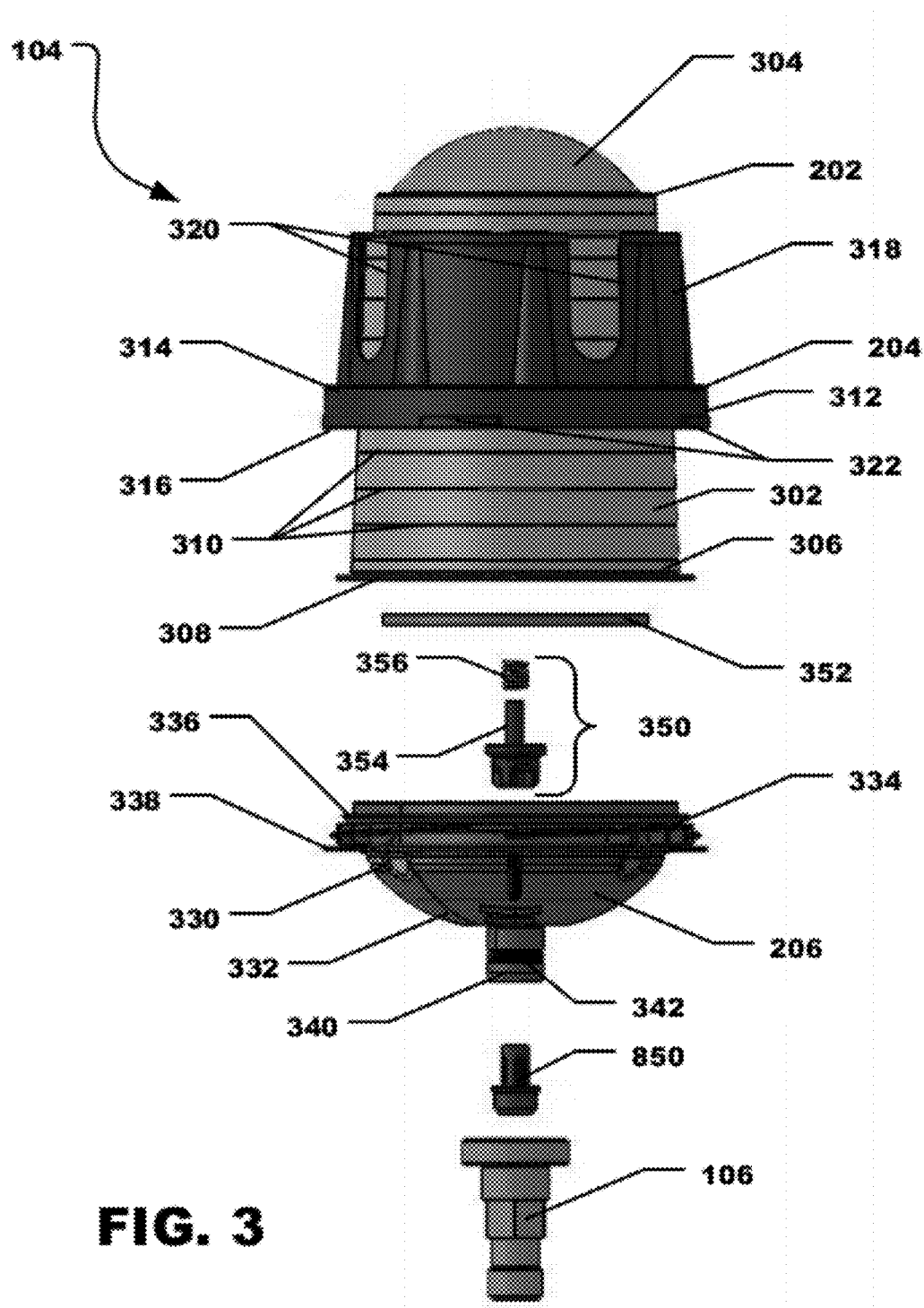
FIG. 3 includes an exploded plan view of a paint cup assembly and an adapter in accordance with a particular embodiment.

As indicated in FIG. 2 and FIG. 3, the paint cup assembly 104 can include a paint reservoir, e.g., a paint liner 202. The paint cup assembly 104 can also include an extended ring 204 that can at least partially surround the paint liner 202. In a particular aspect, the extended ring 204 can include an axial extension, e.g., a skirt, that can extend toward a closed proximal end of the paint liner such that the ring can be configured to allow a user to grasp the paint cup assembly without collapsing the paint liner during attachment with a paint sprayer. As illustrated, the paint cup assembly 104 can include a cap 206 that can be threadably engaged with the extended ring 204. As described in detail below, the cap 206 can engage the adapter 106 in order for the paint cup assembly 104 to be attached to a spray gun (not illustrated).

FIG. 3 indicates that the paint liner 202 can include a hollow body 302 that defines a proximal end 304 and a distal end 306. The hollow body 302 can be generally frustoconical. The proximal end 304 of the hollow body 302 can be closed. Further, the proximal end 304 of the hollow body 302 can be rounded. The distal end 306 of the hollow body 302 can be open and can facilitate filling the paint liner 202 with paint, as described in detail below. The hollow body 302 can also include a rim 308 that circumscribes the distal end 306 of the hollow body 302. When the extended ring 204 is engaged with the cap 206, the rim 308 of the paint liner 202 can be captured, or otherwise trapped, between the extended ring 204 and the cap 206.

In a particular aspect, the paint liner 202, including the hollow body 302, can be transparent. In another aspect, the paint liner 202, including the hollow body 302, can be translucent. In still another aspect, the paint liner 202, including the hollow body 302, can be opaque. In still another aspect, portions of the paint liner 202 can be opaque and other portions can be transparent, translucent, or a combination thereof. For example, the paint liner 202 can substantially opaque with one or more transparent strips to facilitate measuring while filling the paint liner 202 with paint.

In a particular aspect, the paint liner 202 can be disposable. Further, in a particular aspect, the paint liner 202 can be collapsible. Specifically, the paint liner 202 can be collapsible as paint is withdrawn from within the paint liner 202. Also, in a particular aspect, the paint liner 202 can be constructed from low density polyethylene (LDPE).

As illustrated in FIG. 3, the paint liner 202 can include a plurality of indicia 310 spaced along the length of the hollow body 302 of the paint liner 202. Each of the indicia can be space along the length of the hollow body 302. Each of the indicia 310 can represent an incremental change in an internal volume of the paint liner. In a particular aspect, the plurality of indicia 310 can be lines that are printed, or otherwise disposed, on an exterior surface of the body 302. In another aspect, the plurality of indicia 310 can be printed, or otherwise disposed, on an interior surface of the body 302. In still another aspect, the plurality of indicia 310 can be printed, or otherwise disposed, on an interior surface of the body 302 and on an exterior surface of the body 302. The indicia 310 can partially circumscribe the body 302. Alternatively, the indicia 310 can fully circumscribe the body 302.

It can be appreciated that the volume between adjacent indicia can be the same. Further, it can be appreciated that due to the tapered shape of the body 302 the spacing of the indicia along the body can vary.

In a particular aspect, each of the plurality of indicia 310 can be a raised rib extending from the body. Each of the ribs can extend internally into the body. Conversely, each of the ribs can extend externally, or outwardly, from the body.

Figure 3A:
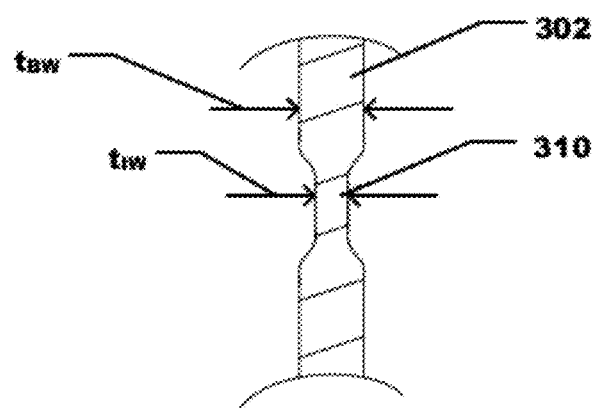
FIG. 3a includes a detailed cross-sectional view of a paint liner.

In another aspect, each of the indicia 310 can serve as a crush zone to facilitate collapsing of the paint liner 202 as paint is expressed from the paint liner 202 during a spraying operation. As illustrated in FIG. 3a, the body 302 of the paint liner 202 can have a body wall thickness, $t_{BW}$, and each of the indicia 310 can have an indicia wall thickness, $t_{IW}$, and the indicia wall thickness can be less than the body wall thickness.

In a particular aspect, the indicia wall thickness can be less than or equal to ninety percent (90%) of the body wall thickness. In another aspect, the indicia wall thickness can be less than or equal to eighty-five percent (85%) of the body wall thickness. In yet another aspect, the indicia wall thickness can be less than or equal to eighty percent (80%) of the body wall thickness. In still another aspect, the indicia wall thickness can be less than or equal to seventy-five percent (75%) of the body wall thickness. In another aspect, the indicia wall thickness can be less than or equal to seventy percent (70%) of the body wall thickness. In still yet another aspect, the indicia wall thickness can be less than or equal to sixty-five percent (65%) of the body wall thickness. In yet another aspect, the indicia wall thickness can be less than or equal to sixty percent (60%) of the body wall thickness.

In another aspect, the indicia wall thickness can be less than or equal to fifty-five percent (55%) of the body wall thickness. In still another aspect, the indicia wall thickness can be less than or equal to fifty percent (50%) of the body wall thickness. In another aspect, the indicia wall thickness can be less than or equal to forty-five percent (45%) of the body wall thickness. In another aspect, the indicia wall thickness can be less than or equal to forty percent (40%) of the body wall thickness. In yet another aspect, the indicia wall thickness can be less than or equal to thirty-five percent (35%) of the body wall thickness. Further, in another aspect, the indicia wall thickness can be less than or equal to thirty percent (30%) of the body wall thickness. In still another aspect, the indicia wall thickness can be less than or equal to twenty-five percent (25%) of the body wall thickness. In another aspect, the indicia wall thickness may not be less than twenty percent (20%) of the body wall thickness. Further, the indicia wall thickness can be within a range between and including any of the percentage of body wall thickness values described herein.

Returning to FIG. 3, the extended ring 204 can include a hub 312 having a proximal end 314 and a distal end 316. As illustrated, a skirt 318 can extend longitudinally from the proximal end 314 of the hub 312. The skirt 318 can be formed with a plurality of slots 320. The slots 320 can allow a user to see the indicia 310 on the paint liner 202 while filling the paint liner 202 with paint.

FIG. 3 indicates that the distal end 316 of the hub 312 can be formed with a plurality of teeth 322 that extend radially outward from the hub 312. Accordingly, when viewed from the distal end 316, the hub 312 of the extended ring 204 can have a gear, or cog, shape. This gear, or cog, shape can be configured to key the paint cup assembly 104 to a filling station, described in detail below, during filling. Specifically, the gear shape can be configured to fit into a correspondingly shaped hole formed in a filling station in order to prevent the paint cup assembly 104 from rotating within the hole as the extended ring 204 is engaged with the cap 206.

The hub 312 can include an interior surface (not illustrated) that can be formed with a plurality of internal threads. As such, the hub 312, and the extended ring 204, can be configured to threadably engage the cap 206. When assembled, as illustrated in FIG. 2, the skirt 318 of the extended ring 204 can at least partially surround the paint liner 202. Further, the skirt 318 can extend at least partially along the length of the paint liner 202. In a particular aspect, the skirt 318 can be substantially rigid and the skirt 318 can be configured to be grasped without collapsing the paint liner 202. Particularly, the extended ring 204 can be constructed from twenty percent (20%) talc filled polypropylene.

As further illustrated in FIG. 3, the cap 206 of the paint cup assembly 104 can include generally hemispherical hollow body 329 having a proximal end 330 and a distal end 332. The proximal end 330 of the cap 206 can be formed with a plurality of external threads 334 that are configured to engage the internal threads (not illustrated) formed in the hub 312 of the extended ring 204. The cap 206 can also include a primary sealing structure 336 and a secondary sealing structure 338. The cap 206 can also include an external rim 339 having an external diameter. The primary sealing structure 336 can be located at a distance from the external rim 339 and the secondary sealing structure 338 can be located between the primary sealing structure 336 and the external rim 339.

During use, the extended ring 204 can be threaded onto the cap 206 and the rim 308 of the paint liner 202 can be sandwiched between the extended ring 204 and the cap 206. A primary seal can be established between the rim 308 of the paint liner 202 and the primary sealing structure 336 on the cap 206. The primary seal can substantially prevent fluid from leaking through the interface established by the paint liner 202 and the cap 206. A secondary seal can be established between secondary sealing structure 338 on the cap 206 and the hub 312 of the extended ring 204. The secondary seal can substantially prevent fluid from leaking through the interface established by the cap 206 and the extended ring 204.

Accordingly, when the paint cup assembly 104 is filled with fluid and assembled as illustrated in FIG. 1, the paint cup assembly 104 can be shaken to stir, or otherwise mix, the fluid within the paint cup assembly 104.

As illustrated in FIG. 3, the cap 206 can include an outlet tube 340 that can extend from the distal end 332 of the cap 206. Specifically, the outlet tube 340 can extend from the center of the distal end 332 of the cap 206. The outlet tube 340 can be configured to be removably engaged with the adapter 106. For example, as depicted in FIG. 3, the outlet tube 340 can be formed with external threads 342.

Figure 4:
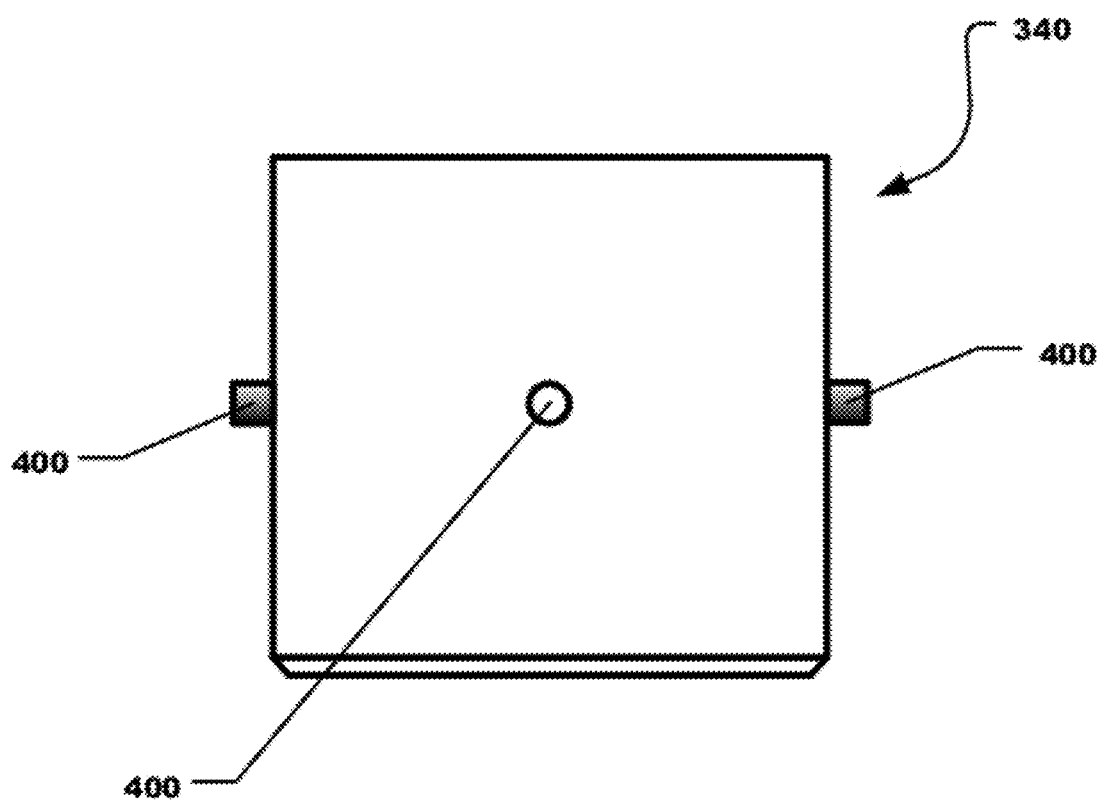
FIG. 4 includes a detailed plan view of a first embodiment of a paint cup assembly outlet tube in accordance with a particular embodiment.

Alternatively, as illustrated in FIG. 4, the outlet tube 340 can be formed within one or more locking pins 400 that can extend radially outward from the outlet tube 340. The locking pins 400 can be configured to engage one or more grooves, or slots, formed within the adapter 106. Examples of grooves or slots formed within the adapter 106 are described below in conjunction with FIG. 10 and FIG. 11.

Figure 5:
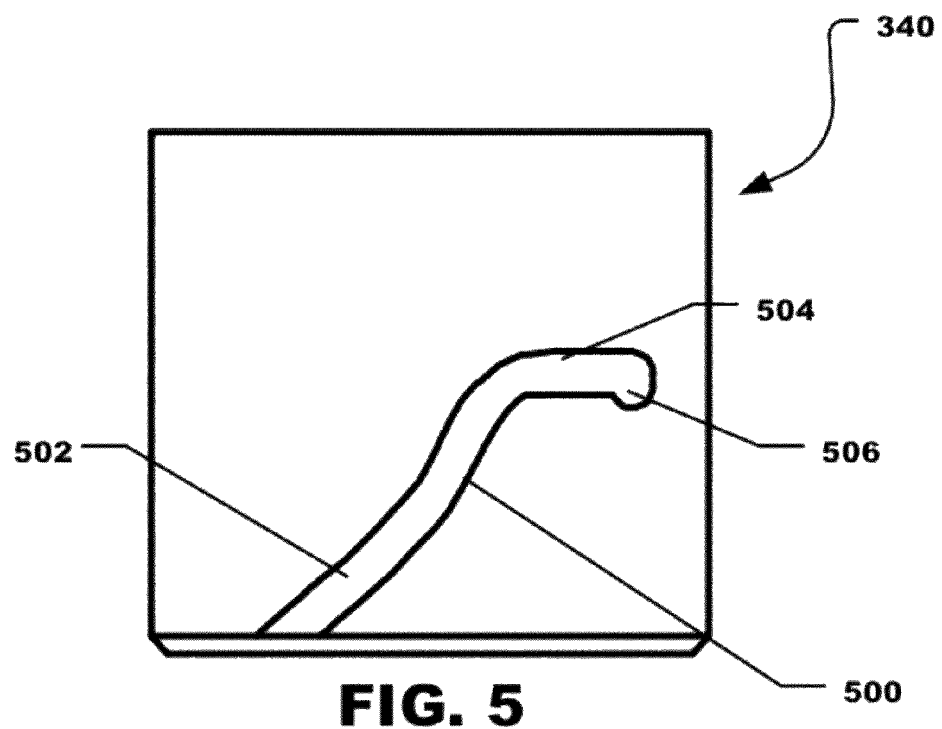
FIG. 5 includes a detailed plan view of a second embodiment of a paint cup assembly outlet tube in accordance with a particular embodiment.

In another aspect, the outlet tube 340 can be formed with one or more grooves configured to engage one or more locking pins within the adapter. FIG. 5 illustrates one such groove, generally designated 500. As such, the groove 500 can include a generally helical portion 502 that extends to a relatively straight portion 504. The relatively straight portion 504 can be substantially parallel to the end face of the outlet tube 340. To install the paint cup assembly 104 (FIG. 3) within the adapter 106 (FIG. 3), the outlet tube 340 can be inserted into the adapter 106 (FIG. 3) such that the groove 500, or grooves, fit over corresponding locking pins. Thereafter, the paint cup assembly 104 (FIG. 3) can be rotated in order to move the groove 500, or grooves, over the locking pins until the paint cup assembly 104 (FIG. 3) is essentially locked in placed within the adapter 106 (FIG. 3).

It can be appreciated that a spring in a valve assembly, described below, can provide a biasing force to facilitate locking the paint cup assembly 104 (FIG. 3) within the adapter 106 (FIG. 3). Further, it can be appreciated that the relatively straight portion 504 can be slightly angled with respect to the end face of the outlet tube 340 in order to provide a ramped structure to further facilitate locking the paint cup assembly 104 (FIG. 3) within the adapter 106 (FIG. 3). For example, the relatively straight portion 504 can be angled in a range of one degree to twenty degrees (1°-20°) relative to a line parallel to the end face of the outlet tube 340. Additionally, the relatively straight portion 504 can terminate in a notch 506, or divot. A locking pin can move into the notch 506 and can further secure attachment of the paint cup assembly 104 (FIG. 3) to the adapter (FIG. 3).

Figure 6:
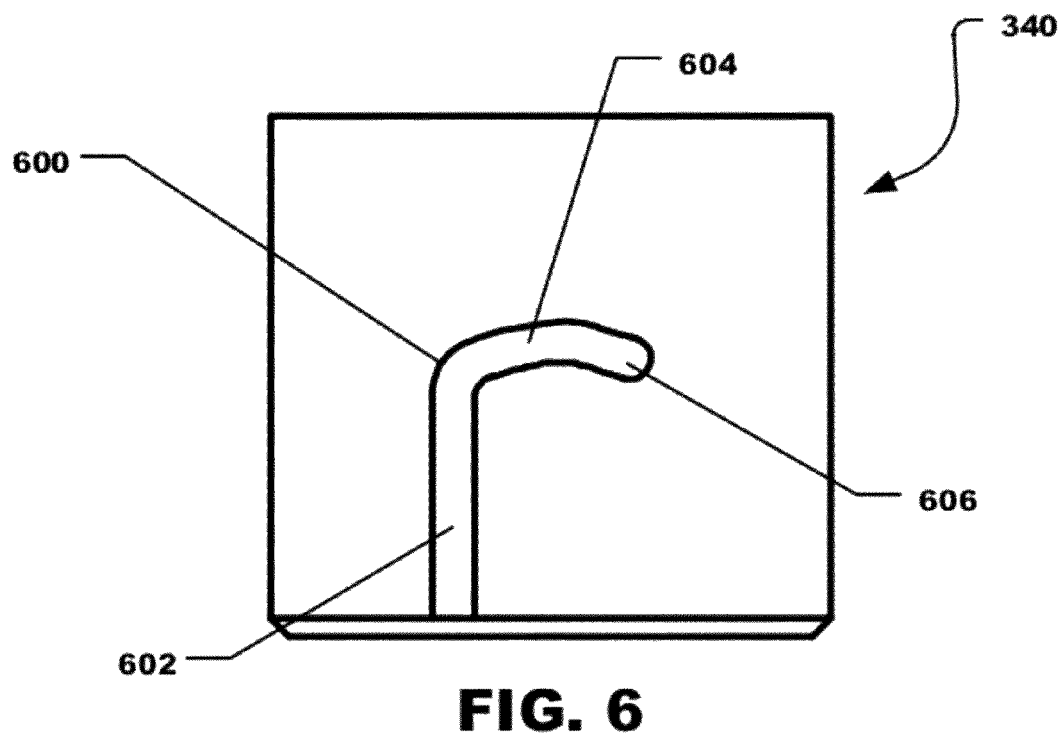
FIG. 6 includes a detailed plan view of a third embodiment of a paint cup assembly outlet tube in accordance with a particular embodiment.

FIG. 6 illustrates another groove, generally designated 600. As illustrated, the groove 600 can include a vertical portion 602 that can be substantially perpendicular to the end face of the outlet tube 304. The vertical portion 602 leads to a first angled portion 604 that can be angled away from the end face of the outlet tube 304, e.g., in a range of one degree to twenty degrees (1°-20°). The first portion 604 can be angled with respect to a line parallel to the end face of the outlet tube 304. A second angled portion 606 extends from the first angled portion 604 in the opposite direction as the first angled portion 604, i.e., toward the end face of the outlet tube 304. The second angled portion 606 can be angled in a range of one degree to twenty degrees (1°-20°). The second angled portion 606 can be angled with respect to a line parallel to the end face of the outlet tube 304.

In a particular aspect, the cap 206 can be constructed from polypropylene (PP).

Returning to FIG. 3, the paint cup assembly 104 can also include a valve assembly 350. The valve assembly 350 can be installed within the cap 206. Specifically, the valve assembly 350 can be installed within the cap 206 between the outlet tube 340 and a valve retainer 352. The valve assembly 350 can include a plunger 354 and a spring 356. In another aspect, the valve assembly 350 can include a ball (not illustrated) in lieu of a plunger.

In a particular aspect, the plunger 354 can be constructed from a thermoplastic elastomer (TPE). Further, the spring 365 can be a conical compression spring made from stainless steel.

Figure 7:
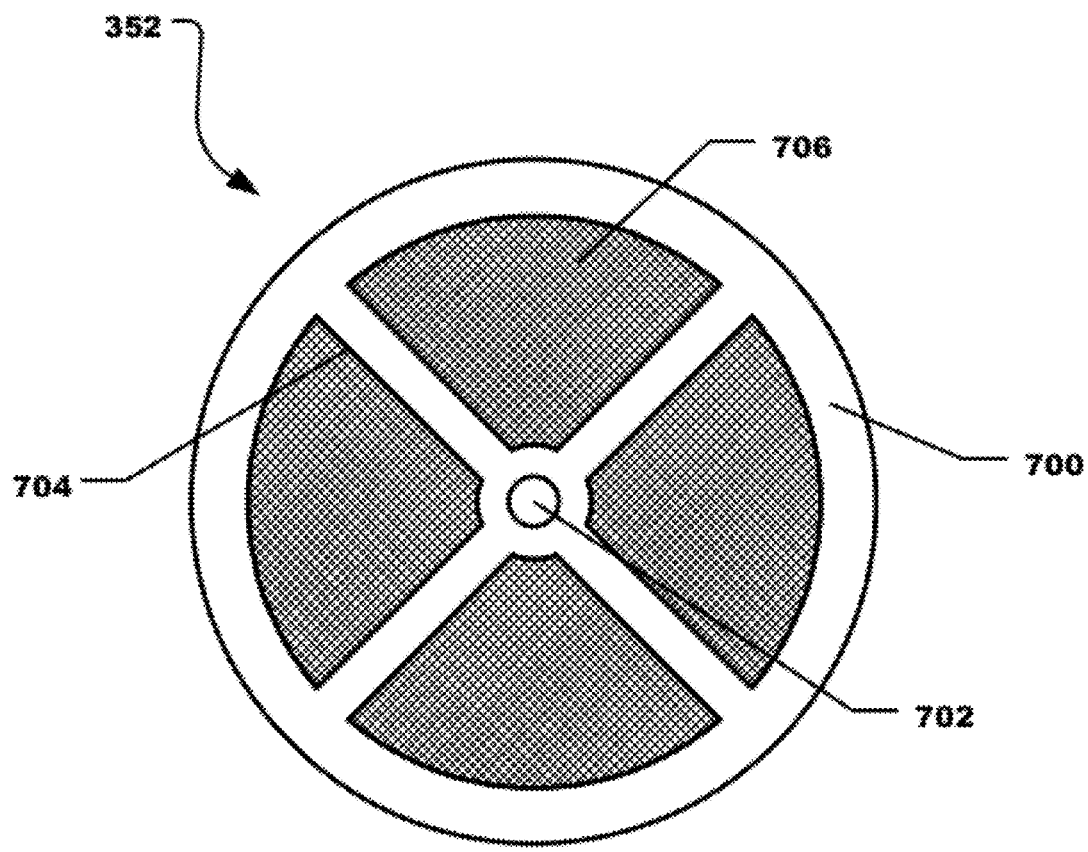
FIG. 7 includes a plan view of a valve retainer in accordance with a particular embodiment.

As illustrated in FIG. 7, the valve retainer 352 include a generally disk shaped frame 700. The frame 700 of the valve retainer 352 can be formed with a central opening 702 through which a portion of the plunger 354 can extend through after installation and during operation of the valve assembly 350, as described below. FIG. 7 depicts that the frame 700 of valve retainer 352 can include one or more windows 704, or openings, formed therein. A filter material 706, e.g., a mesh type material, can be disposed within each window 704. In a particular aspect, the frame 700 can include an upper portion and a lower portion and the filter material 706 can be sandwiched there between. In another aspect, the frame 700 can be a single piece and formed with the windows 704 and the filter material 706 can be welded to an upper surface or lower surface of the frame 700.

In a particular aspect, the frame 700 of the valve retainer 352 can be constructed from polypropylene. Further, the filter material 706 can be a mesh type material suitable for filtering a fluid such as paint.

Figure 8:
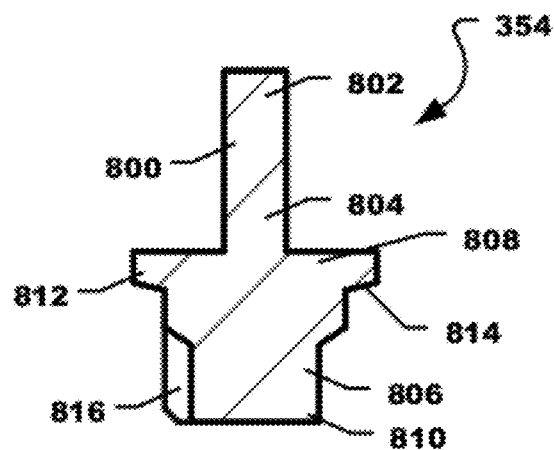
FIG. 8 includes a cross-sectional view of a valve plunger in accordance with a particular embodiment.

As illustrated in FIG. 8, the plunger 354 can include a shaft 800 that can include a proximal end 802 and a distal end 804. A head 806 can extend from the distal end 804 of the shaft 800. The head 806 of the plunger 354 can include a proximal end 808 and a distal end 810. A sealing collar 812 can extend radially from the proximal end 808 of the head 806. The sealing collar 812 can be formed with a sealing face 814. The sealing face 814 of the sealing collar 812 can be configured to engage a valve seat, described below, formed in the outlet tube 340 (FIG. 3) of the cap 206 (FIG. 3). When the sealing face 814 engages the valve seat, flow through the outlet tube 340 (FIG. 3) can be substantially blocked and the paint cup assembly 104 (FIG. 3) can be sealed.

FIG. 8 depicts that the head 806 of the plunger 354 can be formed with one or more flutes 816. The flutes 816 can facilitate fluid flow through the paint cup assembly 104 (FIG. 3) when the sealing face 814 is disengaged from the valve seat.

Figure 9:
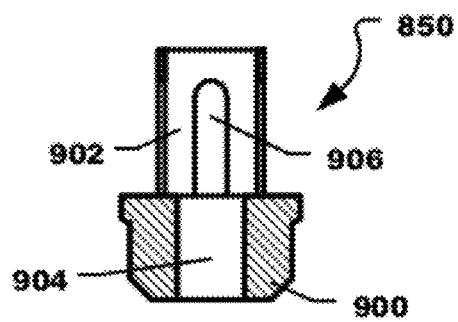
FIG. 9 includes a cross-sectional view of a valve actuator in accordance with a particular embodiment.

Returning to FIG. 3, the paint cup assembly 104 can further include the adapter 106. A valve actuator 850 can be installed within the adapter 106. FIG. 9 illustrates further details concerning the valve actuator 850 and FIG. 10 illustrates further details regarding the adapter 106.

As illustrated in FIG. 9, the valve actuator 850 can include a generally cylindrical, base 900. A generally cylindrical, hollow post 902 can extend from the base 900. As illustrated, the base 900 can be formed with a central bore 904. Further, the post 902 can be formed with one or more slots 906, or openings. The slots 906 are configured to allow fluid, e.g., paint, to flow through the post 902 and the base 900 when the valve assembly 350 (FIG. 3) is in the open configuration. In a particular embodiment, the post 902 can be configured to engage the plunger 354 (FIG. 3, FIG. 8) and move the plunger 354 linearly in order to disengage the sealing face 814 (FIG. 8) of the plunger 354 (FIG. 8) from the valve seat, described in detail below in conjunction with FIG. 13.

In a particular aspect, the valve actuator 850 can be constructed from nylon.

Figure 10:
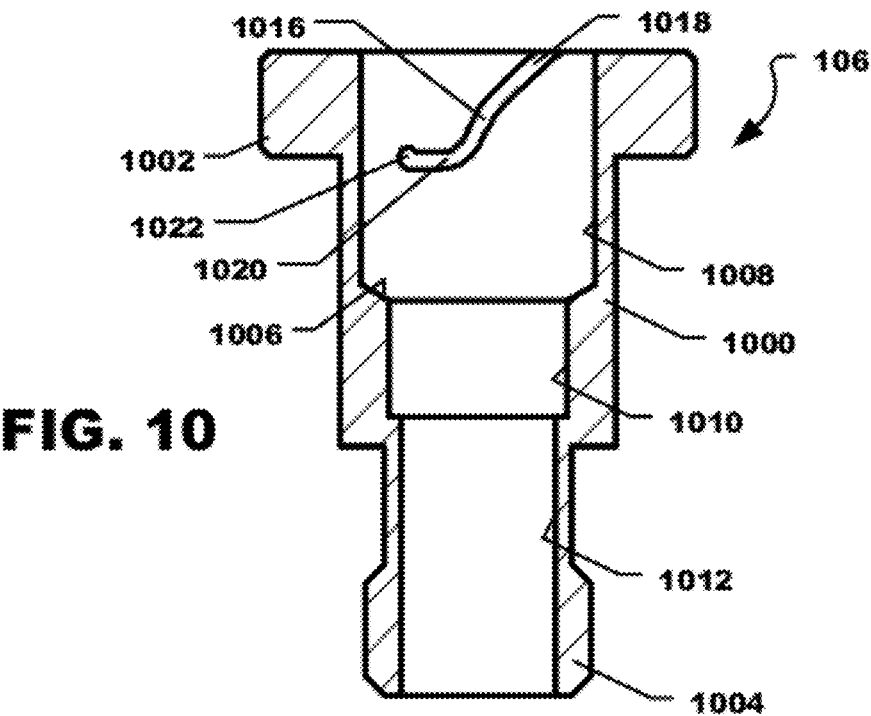
FIG. 10 includes a cross-sectional view of a first embodiment of an adapter in accordance with a particular embodiment.

FIG. 10 depicts details concerning the construction of the adapter 106. As illustrated, the adapter 106 can include an adapter body 1000 that can define a proximal end 1002 and a distal end 1004. Further, the adapter 106 can include an internal bore 1006 along the length of the adapter body 1000. The internal bore 1006 can include a first bore portion 1008 that can extend from the proximal end 1002 of the adapter body 1000 toward the distal end 1004 of the adapter body 1002. Further, the internal bore 1006 can include a second bore portion 1010 that can extend from the first bore portion 1008 toward the distal end 1004 of the adapter body 1002. A third bore portion 1012 can extend from the second bore portion 1010 and terminate at the distal end 1004 of the adapter body 1002.

In a particular aspect, the base 900 (FIG. 9) of the valve actuator 354 (FIG. 3) can be sized and shaped to fit into the second bore portion 1010 of the internal bore 1006 formed in the adapter body 1000. Moreover, the base 900 (FIG. 9) of the valve actuator 354 (FIG. 3) can be press fitted into the second bore portion 1010.

As illustrated in FIG. 10, the first bore portion 1008 can be formed with one or more grooves 1016 that can be configured to engage one or more locking pins 400 (FIG. 4) that extend radially outward from the outlet tube 340 (FIG. 4) of the cap 206 (FIG. 3). The groove 1016 can include a generally helical portion 1018 that can extend to a relatively straight portion 1020. The relatively straight portion 1020 can be substantially parallel to the end face of the adapter 106. To install the paint cup assembly 104 (FIG. 3) within the adapter 106 (FIG. 3), the outlet tube 340 (FIG. 3) can be inserted into the adapter 106 (FIG. 3) such that the locking pins 400 (FIG. 4) fit into corresponding grooves 1016. Thereafter, the paint cup assembly 104 (FIG. 3) can be rotated in order to move the locking pins 400 (FIG. 4) within the grooves 1016 until the paint cup assembly 104 (FIG. 3) is essentially locked in placed within the adapter 106 (FIG. 3).

It can be appreciated that the relatively straight portion 1020 can be slightly angled toward to the end face of the adapter 106 in order to provide a ramped structure to further facilitate locking the paint cup assembly 104 (FIG. 3) within the adapter 106 (FIG. 3). For example, the relatively straight portion 1020 can be angled in a range of one degree to twenty degrees (1°-20°) relative to a line parallel to the end face of the adapter 106. Additionally, the relatively straight portion 1020 can terminate in a notch 1022, or divot. A locking pin can move into the notch 1022 and can further secure attachment of the paint cup assembly 104 (FIG. 3) to the adapter 106 (FIG. 3).

Figure 11:
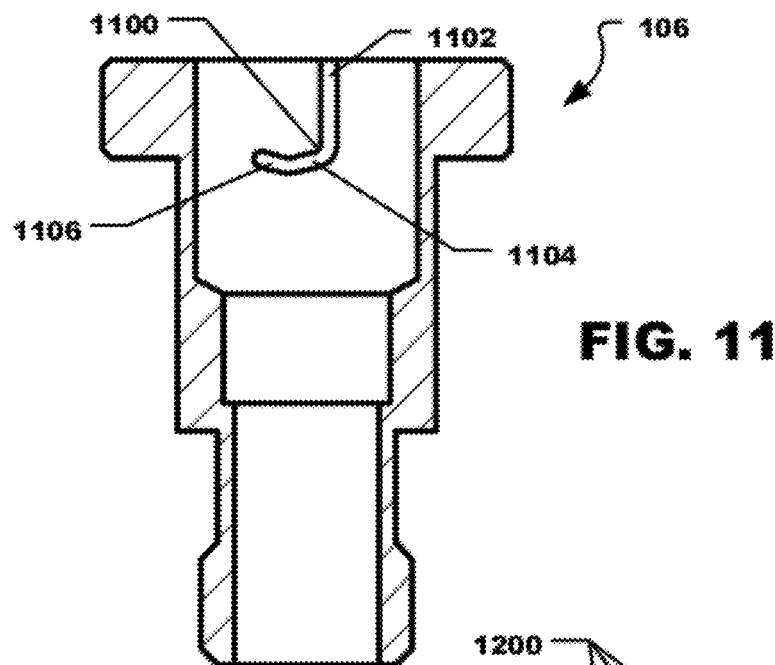
FIG. 11 includes a cross-sectional view of a second embodiment of an adapter in accordance with a particular embodiment.

FIG. 11 illustrates another groove, generally designated 1100, that can be formed in the adapter 106. As illustrated, the groove 1100 can include a vertical portion 1102 that can be substantially perpendicular to the end face of the adapter 106. The vertical portion 1102 leads to a first angled portion 1104 that can be angled away from the end face of the adapter 106, e.g., in a range of one degree to twenty degrees (1°-20°). The first portion 1104 can be angled with respect to a line parallel to the end face of the adapter 106. A second angled portion 1106 can extend from the first angled portion 1104 in the opposite direction as the first angled portion 1104, i.e., toward the end face of the adapter 106. The second angled portion 1106 can be angled in a range of one degree to twenty degrees (1°-20°). The second angled portion 1106 can be angled with respect to a line parallel to the end face of the adapter 106.

Figure 12:
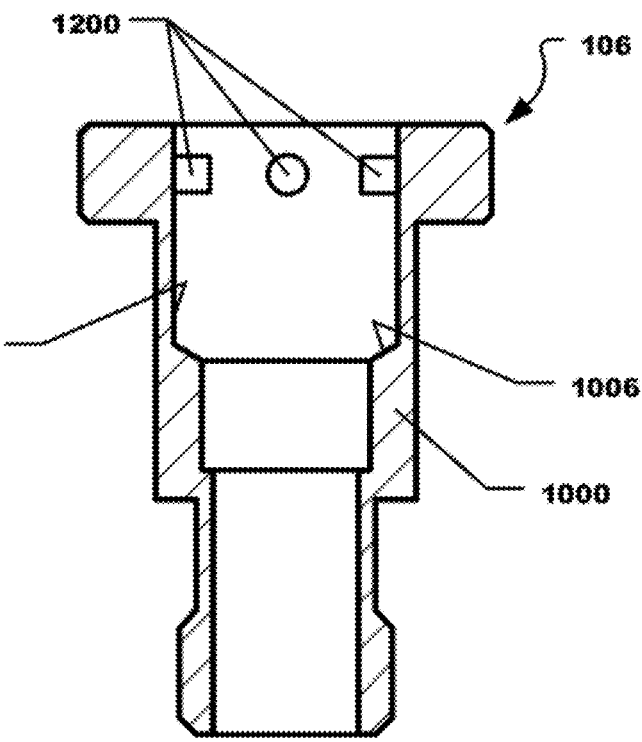
FIG. 12 includes a cross-sectional view of a third embodiment of an adapter in accordance with a particular embodiment.

As illustrated in FIG. 12, in an alternative embodiment, the adapter 106 can be formed within one or more locking pins 1200 that can extend radially inward from the adapter body 1000. For example, the locking pins 1200 can extend radially inward from the wall of the first bore portion 1008 of the internal bore 1006 formed in the adapter body 1000. In a particular aspect, the locking pins 1200 can be configured to engage one or more grooves, or slots, formed within the outlet tube 340 of the cap 206.

In a particular aspect, the adapter 106 can be constructed from a metal, such as aluminum.

Figure 13:
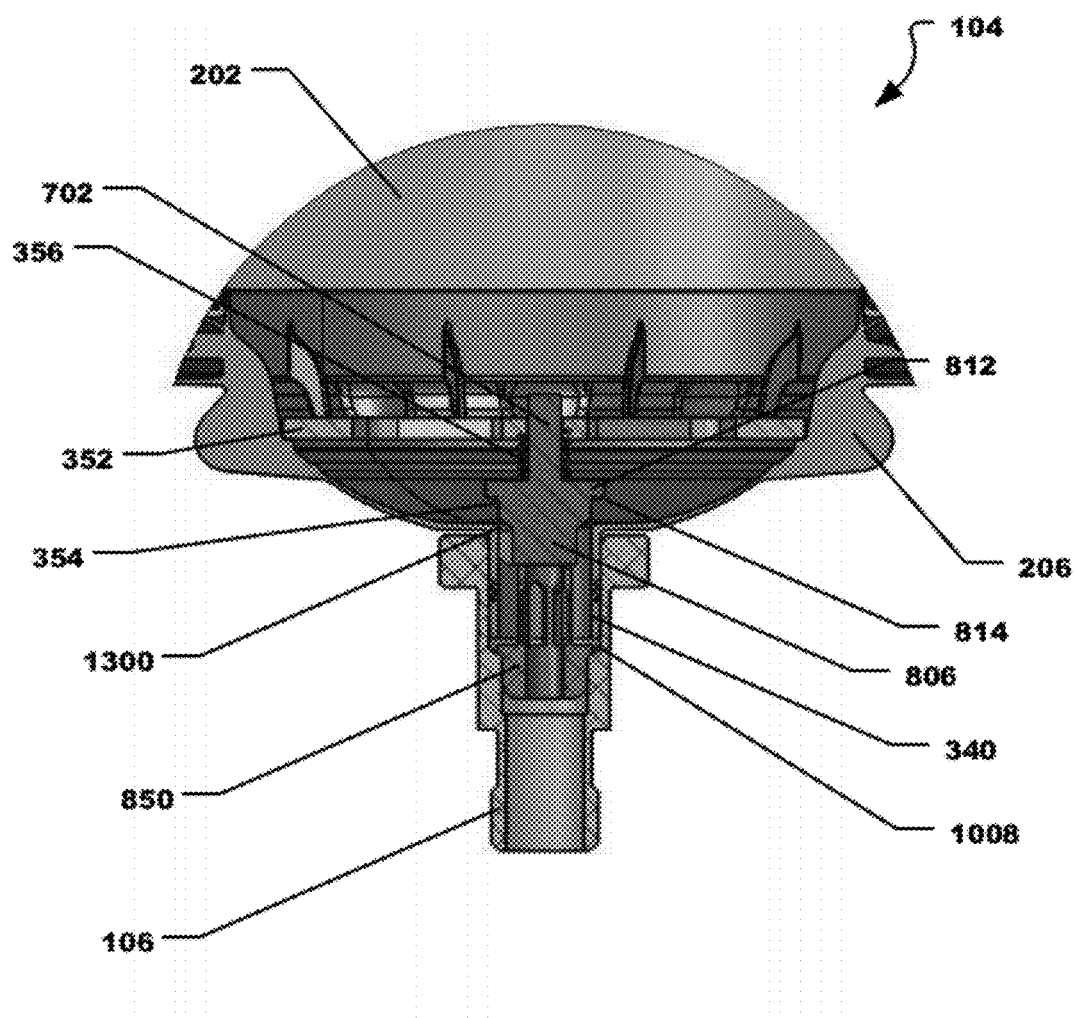
FIG. 13 includes a cross-sectional view of the paint cup assembly taken along line 13-13 in FIG. 2 in accordance with a particular embodiment.

Referring now to FIG. 13, a detailed view of the paint cup assembly 104 is illustrated. FIG. 13 depicts the outlet tube 340 of the cap 206 inserted into the first bore portion 1008 of the internal bore 1006 formed in the adapter 106. As the outlet tube 340 is inserted into the adapter 106, the valve actuator 850 within the adapter 106 can engage the plunger 354 of the valve assembly 350. Specifically, the post 902 of the valve actuator 850 can contact and engage the head 806 of the plunger 354.

The post 902 of the valve actuator 850 can cause the plunger 354 to move linearly into the cap 206 and through the valve retainer 352, e.g., through the central opening 702 of the valve retainer 352. As the plunger 354 moves as described, the spring 356 can be compressed between the valve retainer 352 and the head 806 of the plunger 354. Further, as the plunger 354 moves into the cap 206, the sealing face 814 formed on the sealing collar 812 of the head 806 can be unseated, or otherwise disengaged, from a valve seat 1300 formed within the cap 206 at the base of the outlet tube 340.

As the sealing face 814 of the head 806 is unseated from the valve seat 1300 of the outlet tube 340, fluid, e.g., paint, can flow from the paint liner 202 through the cap 206 and out of the outlet tube 340. The fluid can then flow through the valve actuator 850 and through the adapter 106 into a paint sprayer. As the fluid flows through the cap 206, the filter material 706 (FIG. 7) disposed within the valve retainer 352 can filter the fluid, e.g., to remove any dirt, dust, or other particles.

Accordingly, as illustrated in FIG. 13, the valve assembly 350 can be configured to be operable from a closed configuration in which fluid flow through the outlet tube 340 can be prevented to an open configuration in which fluid flow through the outlet tube 340 can be permitted upon engagement with a paint sprayer. In particular, the open configuration can be achieved automatically during engagement of the paint cup assembly 104 with the adapter 106 or paint sprayer (not illustrated). Further, it can be appreciated that the engagement can be achieved by reducing a distance between the paint cup assembly and the adapter 106 or paint sprayer (not illustrated). Further, in a particular embodiment, engagement can include an interference fi. In another aspect, engagement can include a threaded engagement.

Figure 14:
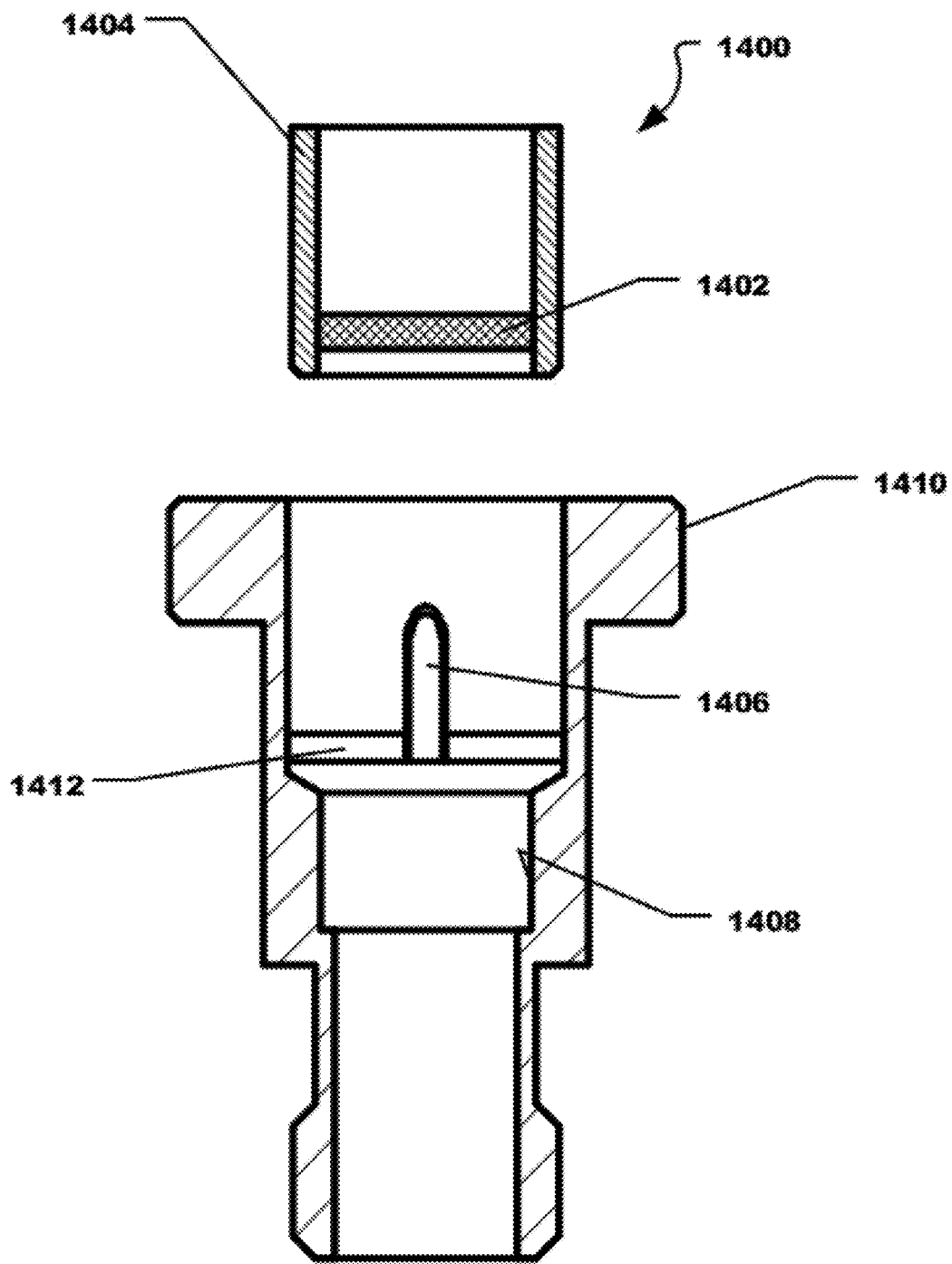
FIG. 14 includes a detailed plan view of a third embodiment of a paint cup assembly valve assembly in accordance with a particular embodiment.

Referring to FIG. 14, a third embodiment of a valve assembly is illustrated and is designated 1400. As illustrated, the valve assembly 1400 can include a membrane 1402 disposed within an outlet tube 1404 of a cap (not illustrated). In particular aspect, the membrane 1402 can be self-sealing when a trocar is removed therefrom.

The valve assembly 1400 can further include a trocar 1406 or a similarly configured needle or piercing hollow shaft. The trocar 1406 can be disposed within an internal bore 1408 of an adapter 1410. The trocar 1406 can be supported by one or more support structures 1412 that extend radially from a base of the trocar 1406 to the wall of the internal bore 1408.

As a paint cup assembly (not illustrated) is engaged with the adapter 1410, the outlet tube 1404 of the cap (not illustrated) can be inserted into the internal bore 1408 of the adapter 1410. Further, as the outlet tube 1404 is pushed into the adapter, the trocar 1406 can pierce the membrane 1402 in order to permit fluid flow out of the paint cup assembly (not illustrated) and through the adapter 1410 into a paint sprayer (not illustrated).

When the paint cup assembly (not illustrated) is disengaged from the adapter 1410, the trocar 1406 can be retracted, or otherwise removed, from the membrane 1402. Once the trocar 1406 is removed from the membrane 1402, the membrane 1402 can seal the hole formed at the location within the membrane 1402 in which the trocar 1406 pierced the membrane 1402. As such, if the paint cup assembly (not illustrated) remains at least partially filled with fluid, leakage of the fluid can be substantially minimized FIG. 15 through FIG. 21 illustrate a paint cup filling station, generally designated 1500. As shown, the paint cup filling station 1500 can include a first paint cup tray 1502 and a second paint cup tray 1504 separated by a housing 1506. Depending on the orientation of the paint cup filling station 1500, the first paint cup tray 1502 can be considered an upper paint cup tray; the second paint cup tray 1504 can be considered a lower paint cup tray; and vice-versa.

The housing 1506 can have a first side wall 1510, a second side wall 1512, a third side wall 1514, and a fourth side wall 1516. Further, the housing 1506 can be constructed from a corrugated material and the housing 1506 can be foldable, or otherwise collapsible. When erected, the side walls 1510, 1512, 1514, 1516 can be connected to adjacent sidewalls 1510, 1512, 1514, 1516, the paint cup trays 1502, 1504, or a combination thereof via one or more fasteners 1520, e.g., removable push pin fasteners, thumb screws, etc.

Figure 15:
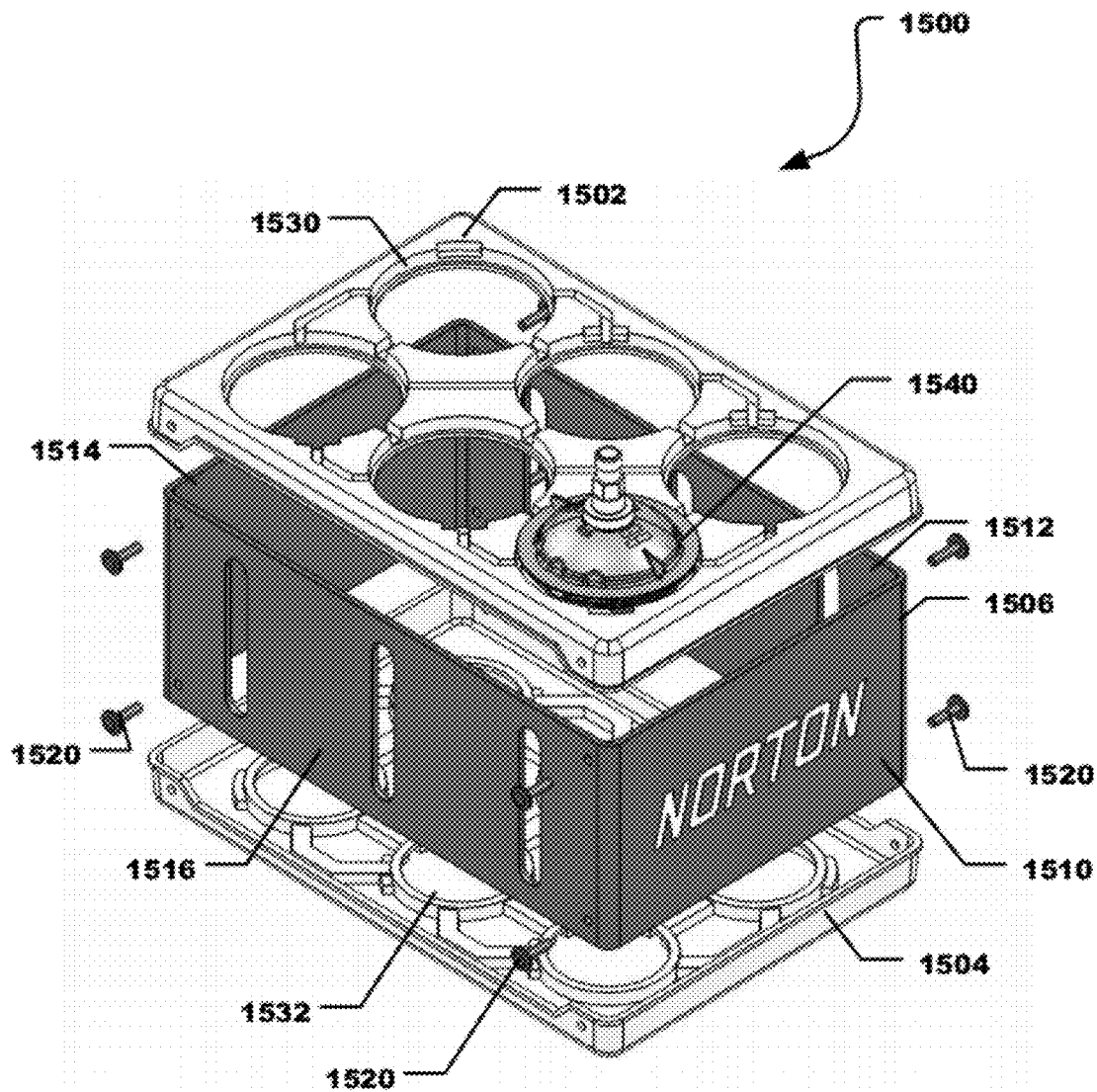
FIG. 15 includes a perspective view of a paint cup assembly filling station in accordance with a particular embodiment.
Figure 16:
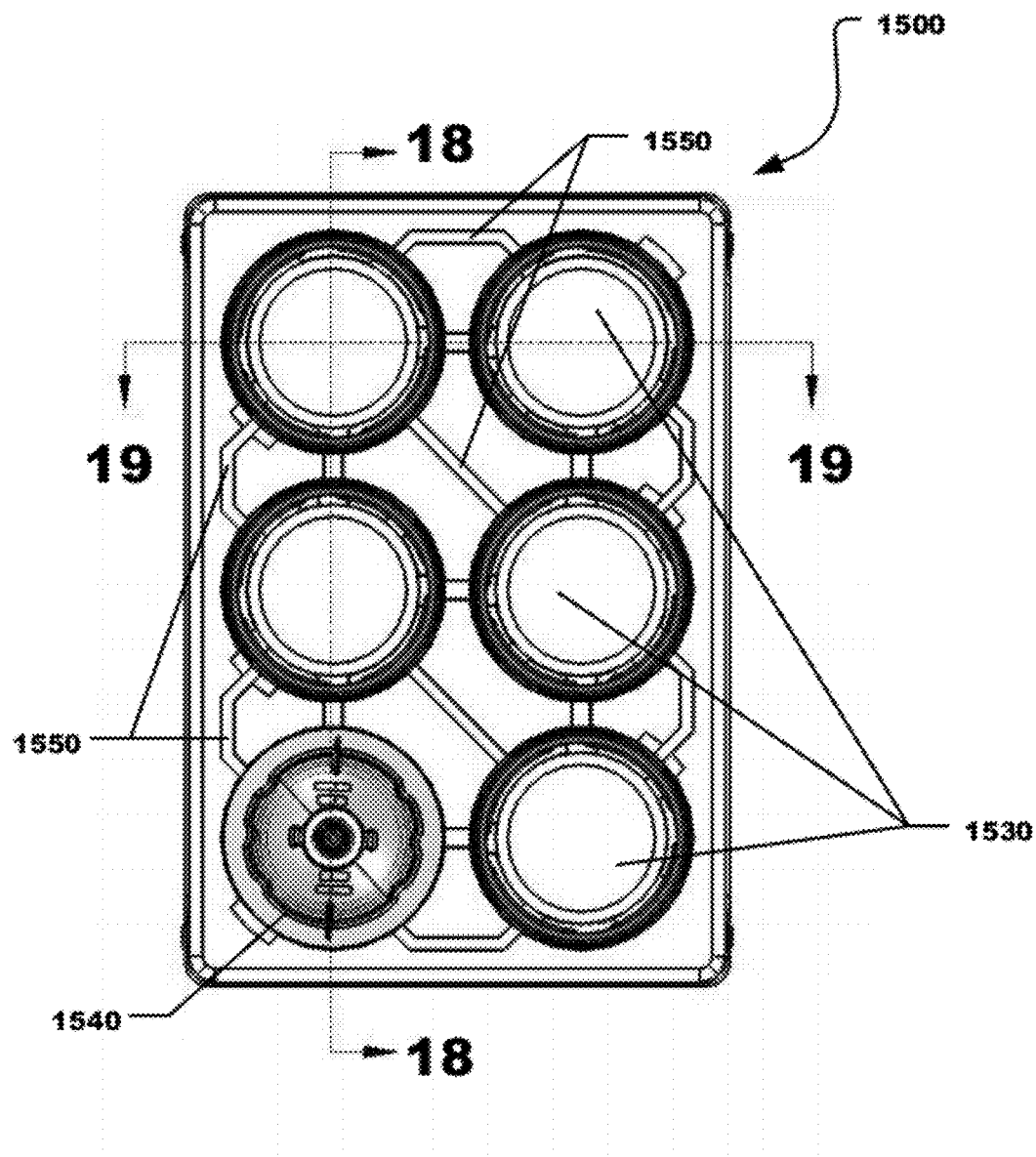
FIG. 16 includes a top plan view of a paint cup assembly filling station in accordance with a particular embodiment.

As shown in FIG. 15 and FIG. 16, the first paint cup tray 1502 can be formed with one or more paint cup assembly holes 1530. Further, the second paint cup tray 1504 can also be formed with one or more paint cup assembly holes 1532. Each paint cup assembly hole 1530, 1532 can be configured to receive a correspondingly sized and shaped paint cup assembly 1540. Further, each paint cup assembly hole 1530, 1532 can be connected to one or more adjoining paint assembly holes 1530, 1532 via one or more fluid channels 1550. Accordingly, if a particular paint cup assembly 1540 is being filled and begins to overfill the fluid, e.g., paint, can flow from the particular paint cup assembly 1540 that is being overfilled and into one or more adjacent paint cup assemblies.

Figure 17:
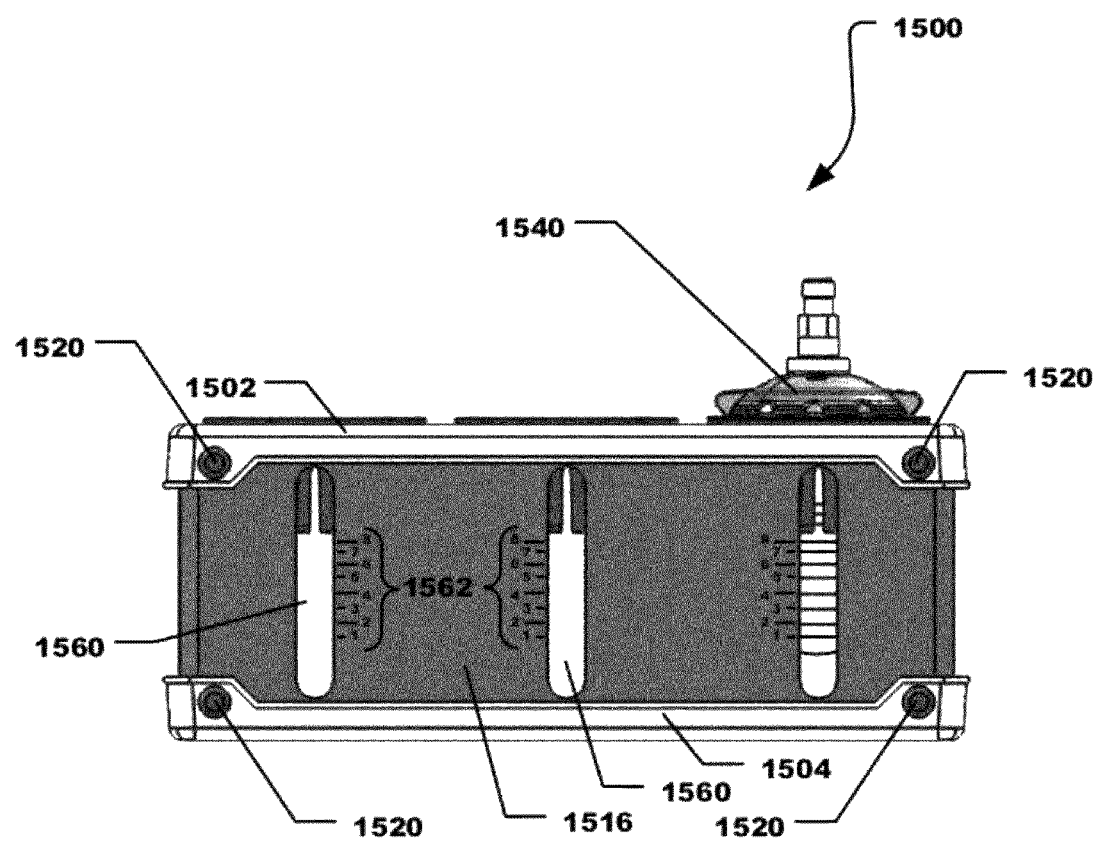
FIG. 17 includes a side plan view of a paint cup assembly filling station in accordance with a particular embodiment.
Figure 18:
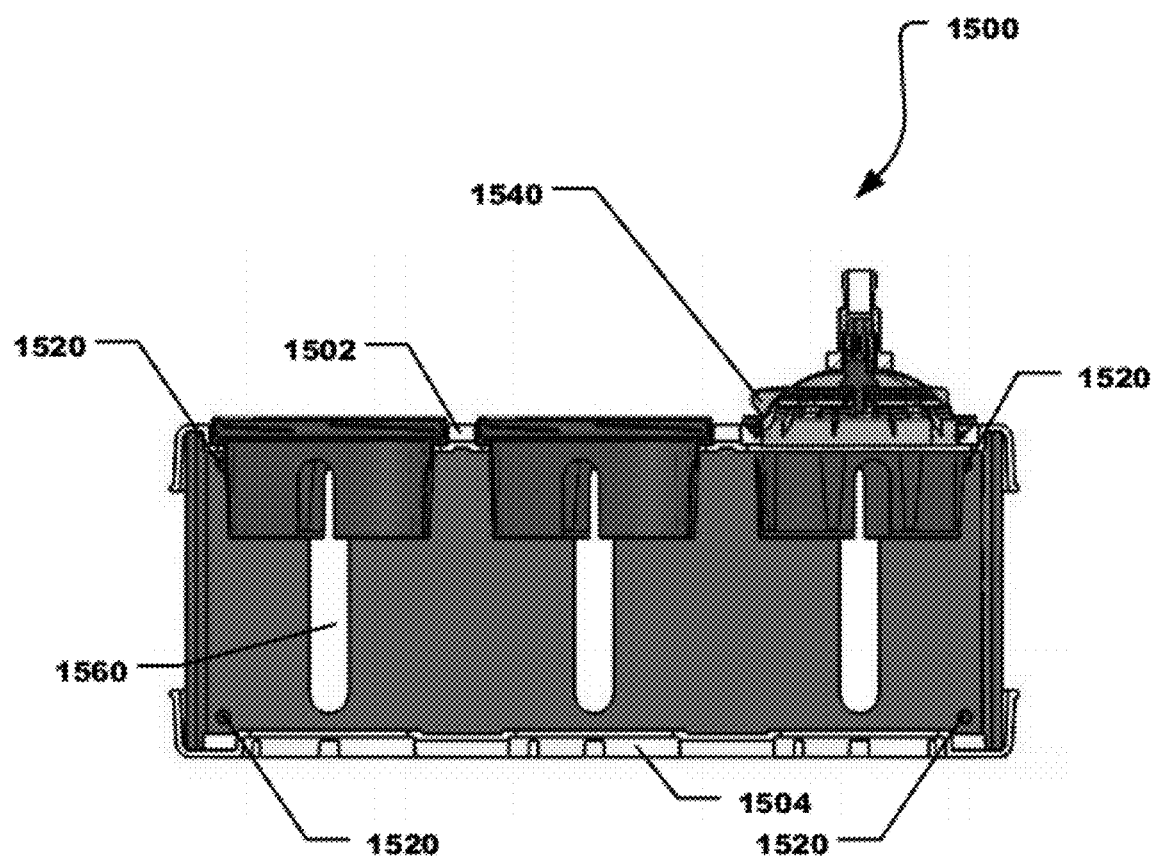
FIG. 18 includes a first cross-sectional view of a paint cup assembly filling station in accordance with a particular embodiment taken along line 18-18 in FIG. 16.
Figure 19:
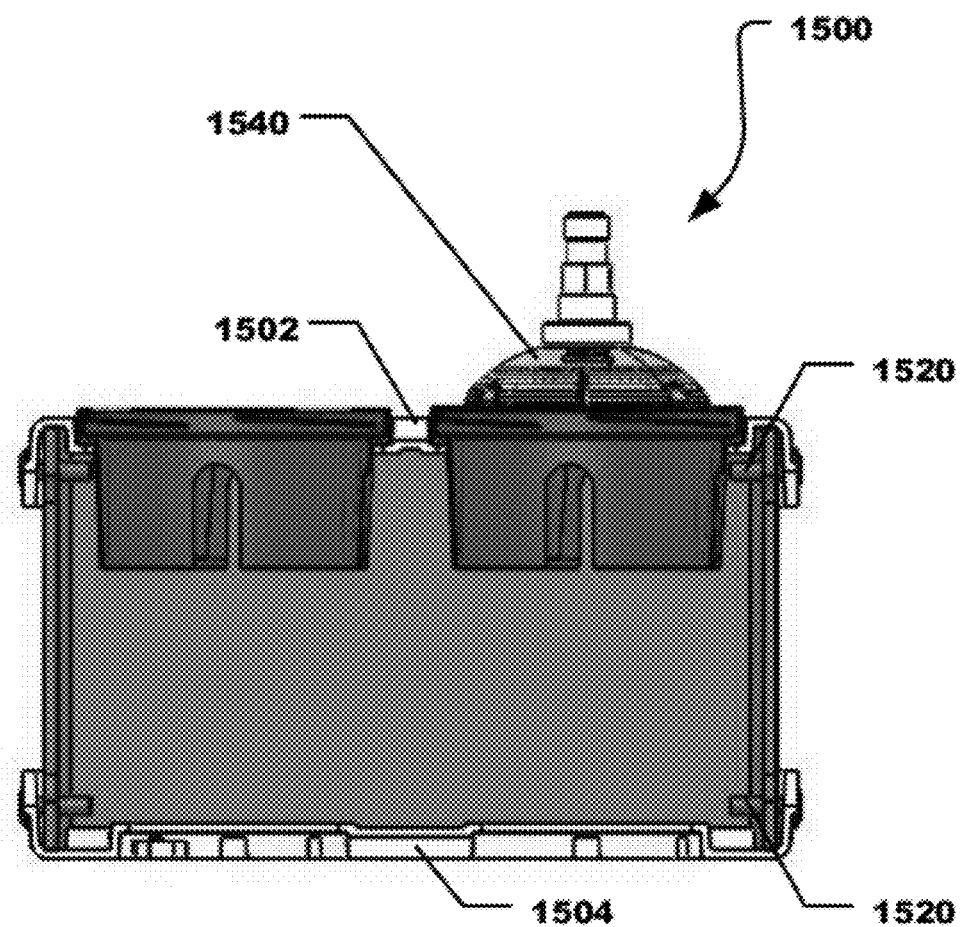
FIG. 19 includes a second cross-sectional view of a paint cup assembly filling station in accordance with a particular embodiment taken along line 19-19 in FIG. 16.

FIG. 17 indicates that at least one of the sidewalls 1510, 1512, 1514, 1516 can be formed with one or more elongated windows 1560. Each elongated window 1560 can be aligned with a respective paint cup assembly hole 1530, 1532. Specifically, a center axis of the window 1560 can be aligned with a center of a paint cup assembly hole 1530, 1532. Each elongated window 1560 can be configured to allow a user to view at least a portion of the paint cup assembly 1540 when the paint cup assembly 1540 is installed in the paint cup filling station 1500. For example, the elongated window 1560 can be configured to allow a user to view a paint liner of the paint cup assembly 1540. Accordingly, the user can easily determine the level of paint in the paint cup assembly 1540 while the paint cup assembly 1540 is being filled with paint.

In a particular aspect, at least a portion of a slot formed in an extended ring of the paint cup assembly 1540, e.g., the slot 320 illustrated in FIG. 2 and FIG. 3, can be substantially aligned with the elongated window 1560 when the paint cup assembly 1540 is installed in the paint cup filling station 1500.

As further illustrated in FIG. 17, the paint cup filling station 1500 can include a group of indicia 1562 adjacent to each elongated window 1560. The indicia 1562 can be used to indicate a volume amount of paint, or fluid, within the paint cup assembly 1540. The indicia 1562 on the paint cup filling station 1500 can be keyed to indicia on the paint liner of the paint cup assembly 1540.

In a particular aspect, the elongated window 1560 can have a window height, $H_W$, measured from a top of the window 1560 to a bottom of the window 1560 along the center axis of the window 1560. A paint liner, e.g., the paint liner 202 depicted in FIG. 2 and FIG. 3, can have paint liner height, $H_{PL}$, measured from the top of a paint liner 202 to a bottom of the paint liner 202 along a center axis of the paint liner 202. Further, in a particular aspect, $H_W$ can be at least 95% $H_{PL}$. For example, $H_W$ can be at least 100% $H_{PL}$, such as at least 105% $H_{PL}$, or at least 110% $H_{PL}$. In another aspect, $H_W$ can be less than or equal to 150% $H_{PL}$, such as less than or equal to 125% $H_{PL}$, or less than or equal to 115% $H_{PL}$. Moreover, $H_W$ can be within a range between and including any of the percentage of $H_{PL}$ values described herein.

In another aspect, the elongated window 1560 can have a window width, $W_W$, measured from a left side of the window 1560 to a right side of the window 1560. The slot in the extended ring of the paint cup assembly 1540 can include a slot width, $W_S$, measured from a left side of the slot to a right side of the slot. In this aspect, $W_W$ can be at least 95% $W_S$. For example, $W_W$ can be at least 100% $W_S$, such as at least 105% $W_S$, or at least 110% $W_S$. In another aspect, $W_W$ can be less than or equal to 150% $W_S$, such as less than or equal to 125% $W_S$, or less than or equal to 115% $W_S$. Moreover, $W_W$ can be within a range between and including any of the percentage of $W_S$ values described herein.

In another aspect, the paint liner of the paint cup assembly 1540 can have an outer diameter, OD, measured at the outer perimeter of the rim of the paint liner. In this aspect, $W_W$ can be at least 5% OD. For example, $W_W$ can be at least 6% OD, such as at least 7% OD, at least 8% OD, at least 9% OD, or at least 10% OD. In another aspect, $W_W$ can be less than or equal to 25% OD, such as less than or equal to 20% OD, or less than or equal to 15% OD. Moreover, $W_W$ can be within a range between and including any of the percentage of OD values described herein.

In a particular aspect, one or more of the paint cup assembly holes 1530, 1532 formed in the first paint cup tray 1502 and the second paint cup tray 1504 can be configured to receive a paint cup assembly having a three ounce (3 oz.) capacity. In another aspect, one or more of the paint cup assembly holes 1530, 1532 formed in the first paint cup tray 1502 and the second paint cup tray 1504 can be configured to receive a paint cup assembly having a five ounce (5 oz.) capacity.

In still another aspect, one or more of the paint cup assembly holes 1530, 1532 formed in the first paint cup tray 1502 and the second paint cup tray 1504 can be configured to receive a paint cup assembly having an eight ounce (8 oz.) capacity. In yet another aspect, one or more of the paint cup assembly holes 1530, 1532 formed in the first paint cup tray 1502 and the second paint cup tray 1504 can be configured to receive a paint cup assembly having a twenty-five ounce (25 oz.) capacity. In another aspect, one or more of the paint cup assembly holes 1530, 1532 formed in the first paint cup tray 1502 and the second paint cup tray 1504 can be configured to receive a paint cup assembly having a thirty-two ounce (32 oz.) capacity.

In another aspect, one or more of the paint cup assembly holes 1530, 1532 formed in the first paint cup tray 1502 and the second paint cup tray 1504 can be configured to receive a paint cup assembly having a ninety milliliter (90 ml) capacity. In yet still another aspect, one or more of the paint cup assembly holes 1530, 1532 formed in the first paint cup tray 1502 and the second paint cup tray 1504 can be configured to receive a paint cup assembly having a one hundred fifty milliliter (150 ml) capacity.

In yet another aspect, one or more of the paint cup assembly holes 1530, 1532 formed in the first paint cup tray 1502 and the second paint cup tray 1504 can be configured to receive a paint cup assembly having a two hundred fifty milliliter (250 ml) capacity. In another aspect, one or more of the paint cup assembly holes 1530, 1532 formed in the first paint cup tray 1502 and the second paint cup tray 1504 can be configured to receive a paint cup assembly having a seven hundred fifty milliliter (750 ml) capacity. In yet another aspect, one or more of the paint cup assembly holes 1530, 1532 formed in the first paint cup tray 1502 and the second paint cup tray 1504 can be configured to receive a paint cup assembly having a nine hundred fifty milliliter (950 ml) capacity. The capacity of the paint cup assembly can be within a range between and including any of the capacity values described above.

It can be appreciated that the first paint cup tray 1502 can include an array of similarly sized paint cup assembly holes 1530 and the second paint cup tray 1502 can include an array of similarly sized paint cup assembly holes 1532. The paint cup assembly holes 1530 in the first paint cup tray 1502 can be different in size from the paint cup assembly holes 1532 in the second paint cup tray 1504. As such, the paint cup assembly filling station 1500 can be oriented as shown to receive paint cup assemblies having a particular size or the paint cup assembly filling station 1500 can be inverted to receive paint cup assemblies having a different size, e.g., capacity.

Also, it can be appreciated that the first paint cup tray 1502, the second paint cup tray 1504, or a combination thereof can include paint cup assembly holes 1532 of varying sizes.

In a particular aspect, the paint cup trays 1502, 1504 are constructed from acrylonitrile butadiene styrene (ABS) plastic. Moreover, the housing 1506 can be constructed from high density polyethylene (HDPE).

Figure 20:
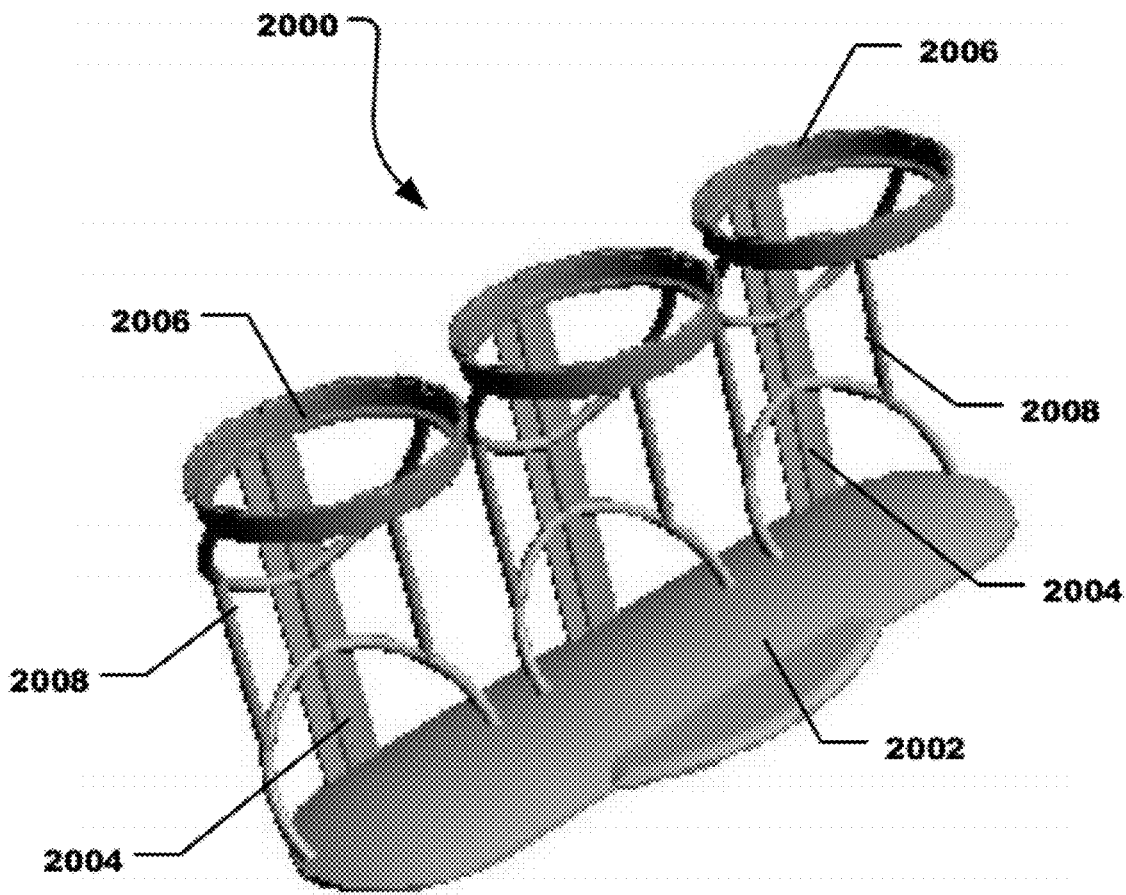
FIG. 20 includes a first perspective view of a paint cup assembly support stand in accordance with a particular embodiment.
Figure 21:
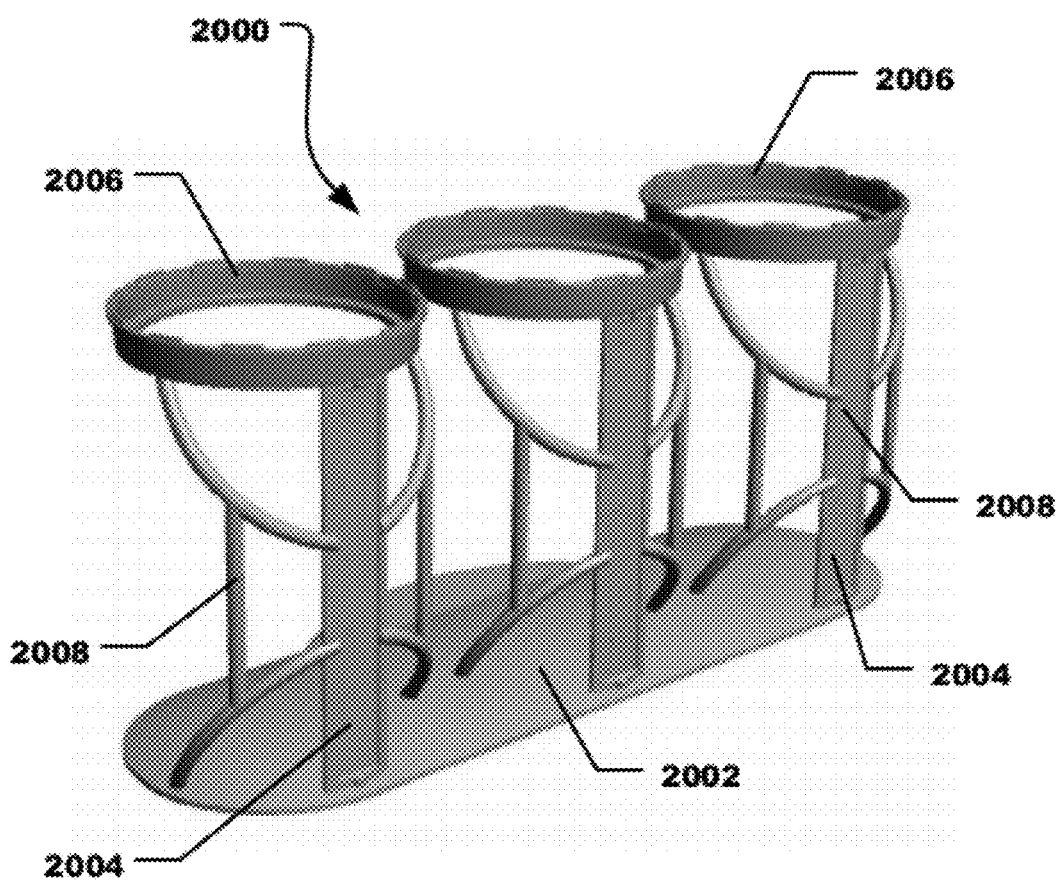
FIG. 21 includes a second perspective view of a paint cup assembly support stand in accordance with a particular embodiment.

Referring now to FIG. 20 and FIG. 21, a paint cup assembly support stand is illustrated and is generally designated 2000. As shown, the paint cup assembly support stand 2000 can include a base 2002. Further, one or more support arms 2004 can extend from the base 2002. In a particular aspect, the support arms 2004 can extend in a direction that is substantially perpendicular to the base 2002. Further, at least one paint cup assembly support ring 2006 can extend from each support arm 2004. Specifically, each paint cup assembly support ring 2006 can be parallel to the base 2002.

As shown in FIG. 20 and FIG. 21, a support frame 2008 can extend from each support arm 2004 to the paint cup assembly support ring 2006 and the base of the paint cup assembly support stand 2000. The support frames 2008 can provide additional structural support for the weight of a paint cup assembly (not shown) inserted into the paint cup assembly support rings 2006.

In a particular aspect, each paint cup assembly support ring 2006 can be configured to receive a paint cup assembly having a three ounce (3 oz.) capacity. In another aspect, each paint cup assembly support ring 2006 can be configured to receive a paint cup assembly having a five ounce (5 oz.) capacity.

In still another aspect, each paint cup assembly support ring 2006 can be configured to receive a paint cup assembly having an eight ounce (8 oz.) capacity. In yet another aspect, each paint cup assembly support ring 2006 can be configured to receive a paint cup assembly having a twenty-five ounce (25 oz.) capacity. In another aspect, each paint cup assembly support ring 2006 can be configured to receive a paint cup assembly having a thirty-two ounce (32 oz.) capacity.

In another aspect, each paint cup assembly support ring 2006 can be configured to receive a paint cup assembly having a ninety milliliter (90 ml) capacity. In yet still another aspect, each paint cup assembly support ring 2006 can be configured to receive a paint cup assembly having a one hundred fifty milliliter (150 ml) capacity.

In yet another aspect, each paint cup assembly support ring 2006 can be configured to receive a paint cup assembly having a two hundred fifty milliliter (250 ml) capacity. In another aspect, each paint cup assembly support ring 2006 can be configured to receive a paint cup assembly having a seven hundred fifty milliliter (750 ml) capacity. In yet another aspect, each paint cup assembly support ring 2006 can be configured to receive a paint cup assembly having a nine hundred fifty milliliter (950 ml) capacity.

FIG. 20 and FIG. 21 indicate that in an exemplary embodiment, the paint cup assembly support stand 2000 can include three support arms 2004 extending from the base 2002 and each support arm 2004 can include a single paint cup assembly support ring 2006. It can be appreciated that the paint cup assembly support stand 2000 can include any number of support arms 2004 and any number of paint cup assembly support rings 2006. For example, in another aspect, the paint cup assembly support stand 2000 can include a single support arm 2004 having multiple paint cup assembly support rings 2006 extending therefrom, e.g., radially. Further, each paint cup assembly support ring 2006 can be similarly sized to receive paint cup assemblies having similar capacities, as described herein. Alternatively, the paint cup assembly support stand 2000 can include multiple paint cup assembly support rings 2006 having various sizes and the paint cup assembly support stand 2000 can receive and support paint cup assemblies having varying capacities.

With the configuration described herein, the paint cup assembly provides a paint cup assembly that is substantially leak-proof regardless of the orientation of the paint cup assembly. Further, the paint cup assembly can be connected to a paint spray gun while the paint spray gun is in an upright position typically used while expelling paint from the paint spray gun. The valve maintains paint within the paint cup assembly until the paint cup assembly is engaged with the paint spray gun and the adapter opens the valve. Further, when the paint cup assembly is disengaged with the paint spray gun, the valve returns to a closed position and seals the outlet of the paint cup assembly. The paint cup assembly can be stored for later use and any remaining paint can stay fresh and usable for an extended period of time. In a particular aspect, the paint spray gun can incorporate one or more of the features of the adapter and in such an aspect, the paint cup assembly can be directly engaged with the paint spray gun without using the adapter. Accordingly, a post within the paint spray gun can be configured to open the valve when the paint cup assembly is directly engaged with the paint spray gun.

Note that not all of the activities described above in the general description or the examples are required, that a portion of a specific activity may not be required, and that one or more further activities can be performed in addition to those described. Still further, the order in which activities are listed is not necessarily the order in which they are performed.

Certain features that are, for clarity, described herein in the context of separate embodiments, can also be provided in combination in a single embodiment. Conversely, various features that are, for brevity, described in the context of a single embodiment, can also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments can also be provided in combination in a single embodiment, and conversely, various features that are, for brevity, described in the context of a single embodiment, can also be provided separately or in any subcombination. Further, reference to values stated in ranges includes each and every value within that range. Many other embodiments can be apparent to skilled artisans only after reading this specification. Other embodiments can be used and derived from the disclosure, such that a structural substitution, logical substitution, or another change can be made without departing from the scope of the disclosure. Accordingly, the disclosure is to be regarded as illustrative rather than restrictive.

What is claimed is:

1. A paint cup assembly for a paint sprayer, the paint cup assembly comprising:
   a paint reservoir;
   a cap configured to engage the paint reservoir, the cap having an outlet;
   a valve assembly disposed within the cap, wherein the valve assembly includes a plunger having a head and a shaft, and wherein the head of the plunger is configured to engage a valve seat formed in the outlet, wherein prior to engagement with a paint sprayer the valve assembly is in a closed configuration in which a paint flow through the outlet is prevented, and wherein after engagement with the paint sprayer the valve assembly is automatically in an open configuration in which the paint flow through the outlet is permitted; and
   a valve retainer installed within the cap, wherein the valve retainer is configured to retain the valve assembly within the cap,
   wherein the valve assembly is adapted to be disposed below the paint reservoir during operation.

2. The paint cup assembly of claim 1, wherein the valve assembly is installed between the outlet and the valve retainer.

3. The paint cup assembly of claim 2, wherein the valve assembly comprises a spring loaded valve assembly.

4. The paint cup assembly of claim 3, wherein the valve assembly is adapted such that the paint flow passes between the plunger and the outlet when the valve assembly is in the open configuration.

5. The paint cup assembly of claim 4, wherein the spring loaded valve assembly further comprises:
   a spring disposed around the shaft of the plunger, wherein the spring is installed in compression between the head of the plunger and the valve retainer and wherein the spring provides a biasing force to move the valve assembly to the closed configuration as the paint cup assembly is disengaged with a paint sprayer.

6. The paint cup assembly of claim 1, wherein the valve retainer comprises a generally flat disk.

7. The paint cup assembly of claim 6, wherein the valve retainer is formed with one or more windows, wherein each of the one or more windows comprises a filter material disposed therein.

8. The paint cup assembly of claim 1, further comprising:
an adapter, wherein the adapter is configured to be installed within a spray gun and configured to receive the paint cup assembly, wherein the adapter is configured to open the valve assembly as the paint cup assembly is engaged with the adapter, and wherein the adapter comprises:
an adapter body;
an outer wall; and
an internal bore formed along the length of the adapter body and circumscribed by the outer wall
a valve actuator disposed within the internal bore.

9. The paint cup assembly of claim 8, wherein the valve actuator comprises a post and wherein the post is configured to open the valve assembly as the outlet of the paint cup assembly is inserted into the adapter.

10. The paint cup assembly of claim 1, wherein a head of the plunger includes one or more flutes.

11. A paint cup assembly for a paint sprayer, comprising:
a paint reservoir;
a cap configured to engage the paint reservoir, the cap having an outlet;
a valve assembly disposed within the cap, wherein the valve assembly includes a plunger having a head and a shaft, and wherein the head of the plunger is configured to engage a valve seat formed in the outlet, wherein the valve assembly is configured to be operable from a closed configuration in which a paint flow through the outlet is prevented to an open configuration in which the paint flow through the outlet is permitted upon engagement with a paint sprayer;
a valve retainer installed within the cap, wherein the valve retainer is configured to retain the valve assembly within the cap; and
a membrane disposed over an end of the outlet, wherein the membrane is configured to be pierced by a trocar as the paint cup assembly is engaged with a paint sprayer.

12. The paint cup assembly of claim 1, wherein the paint sprayer is gravity fed.

13. The paint cup assembly of claim 1, wherein the valve assembly is configured to return to the closed configuration upon disengagement with the paint sprayer.

14. A paint sprayer assembly comprising:
a paint sprayer; and
a paint cup assembly engaged with the paint sprayer, the paint cup assembly comprising:
a paint reservoir;
a cap configured to engage the paint reservoir, the cap having an outlet;
a valve assembly disposed within the cap, wherein the valve assembly includes a plunger having a head and a shaft, and wherein the head of the plunger is configured to engage a valve seat formed in the outlet, wherein the valve assembly is automatically configured to be operable from a closed configuration in which a paint flow through the outlet is prevented to an open configuration in which the paint flow through the outlet is permitted upon engagement with the paint sprayer; and
a valve retainer installed within the cap, wherein the valve retainer is configured to retain the valve assembly within the cap,
wherein the paint cup assembly is disposed above the paint spray gun.

15. The paint sprayer assembly of claim 14, wherein a head of the plunger includes one or more flutes.

16. The paint sprayer assembly of claim 14, wherein the valve retainer comprises a generally flat disk.

17. The paint sprayer assembly of claim 14, wherein the valve assembly is configured to return to the closed configuration upon disengagement with the paint sprayer.

* * * * *